US010324172B2

(12) United States Patent
Glas et al.

(10) Patent No.: US 10,324,172 B2
(45) Date of Patent: Jun. 18, 2019

(54) CALIBRATION APPARATUS, CALIBRATION METHOD AND CALIBRATION PROGRAM

(71) Applicant: Advanced Telecommunications Research Institute International, Kyoto (JP)

(72) Inventors: Dylan Fairchild Glas, Kyoto (JP); Florent Ferreri, Kyoto (JP); Takahiro Miyashita, Kyoto (JP)

(73) Assignee: Advanced Telecommunications Research Institute International, Kyoto (JP)

(*) Notice: Subject to any disclaimer, the term of this patent is extended or adjusted under 35 U.S.C. 154(b) by 396 days.

(21) Appl. No.: 15/192,118

(22) Filed: Jun. 24, 2016

(65) Prior Publication Data
US 2016/0356882 A1 Dec. 8, 2016

Related U.S. Application Data
(63) Continuation of application No. PCT/JP2014/084166, filed on Dec. 24, 2014.

(30) Foreign Application Priority Data

Dec. 27, 2013 (JP) .................. 2013-273079

(51) Int. Cl.
    *G01S 7/497* (2006.01)
    *G01S 17/42* (2006.01)
    (Continued)

(52) U.S. Cl.
    CPC ............ *G01S 7/497* (2013.01); *G01S 17/42* (2013.01); *G01S 17/66* (2013.01); *G01S 17/87* (2013.01)

(58) Field of Classification Search
    CPC ...... G01S 17/89; G01S 17/46; G01B 11/2527
    See application file for complete search history.

(56) References Cited

U.S. PATENT DOCUMENTS 5,793,483 A * 8/1998 Zehnpfennig ........... G01S 5/163
                                                    356/139.03
8,760,521 B2 * 6/2014 Medeiros ................ G06T 7/292
                                                    348/187

(Continued)

FOREIGN PATENT DOCUMENTS

JP    2010-127650    6/2010    .............. G01S 5/14
JP    2012-088135    5/2012    .............. G01S 17/08
JP    2013-073459    4/2013    .............. G06T 7/00

*Primary Examiner* — Luke D Ratcliffe
(74) *Attorney, Agent, or Firm* — Bodner & O'Rourke, LLP; Gerald T. Bodner; Christian P. Bodner

(57) ABSTRACT

[Problem]
To provide a calibration apparatus capable of reducing a workload for calibrating a position and a direction of each range sensor.
[Solving Means]
In the measurement arithmetic unit 100, the social group identification portion 5610 identifies a group candidate that is detected as a group out of moving measuring objects in each laser range finder. The group comparison portion 5612 identifies a group in agreement for each pair of the laser range finder, and calculates the relative position of each pair of the laser range finder according to the position and the directions of the identified matching group. The network position identifying portion 5620 calibrates the position and the direction of each laser range finder in the sensor network coordinate system such that the error of the position of the object observed in common from each pair becomes minimum.

11 Claims, 30 Drawing Sheets

(51) Int. Cl.
    *G01S 17/66*     (2006.01)
    *G01S 17/87*     (2006.01)

(56) References Cited

U.S. PATENT DOCUMENTS

| | | | |
|---|---|---|---|
| 2007/0002304 A1* | 1/2007 | Saltsman | G01C 11/30 356/3.1 |
| 2014/0314278 A1* | 10/2014 | Tatsuzawa | G06K 9/00255 382/103 |
| 2015/0062558 A1* | 3/2015 | Koppal | G01S 17/89 356/5.01 |

* cited by examiner (a)

(b)

(a)

PERSON POSITION LIST

- time, r, θ
- ...
- ...

(b)

GROUP LIST

- time, # members, |v|, {r, θ} × m
- ...
- ...

(c)

LOST OF OBJECTS OBSERVED IN COMMON

- $^1p = \begin{bmatrix} ^1p_x \\ ^1p_y \\ 1 \end{bmatrix}, ^2p = \begin{bmatrix} ^2p_x \\ ^2p_y \\ 1 \end{bmatrix}$
- ...
- ...

(d)

SENSOR POSITION LIST

- SENSOR 1, x, y, θ
- ...
- SENSOR n, x, y, θ

(a) GROUP OBSERVED BY LRF S1

(b) ENUMERATION OF OBSERVED POSSIBLE SUBGROUPS (c) CALCULATE DESCRIPTION VECTOR FOR EACH SUBGROUP

DETERMINE GROUP CENTER

CALCULATE AVERAGE MOVING VELOCITY

ENUMERATION OF MEMBERS (a) RANGE SENSOR "L"

(b) RANGE SENSOR "N"

FIG. 15

|  | NUMBER OF MEMBERS | \|v\| in mm/s | m1(r, θ) | m2(r, θ) | m3(r, θ) |
|---|---|---|---|---|---|
| RANGE SENSOR L | | | | | |
| GROUP 1 | 2 | 940 | (341, 107°) | (341, 287°) | |
| GROUP 2 | 3 | 718 | (674, 58°) | (276, 159°) | (677, 262°) |
| SUBGROUP 2a | 2 | 710 | (388, 37°) | (388, 217°) | |
| SUBGROUP 2b | 2 | 696 | (393, 102°) | (393, 282°) | |
| SUBGROUP 2c | 2 | 789 | (661, 70°) | (661, 250°) | |
| RANGE SENSOR N | | | | | |
| GROUP 3 | 2 | 768 | (659, 72°) | (659, 252°) | |

FIG. 24

| TRAIL | TRANSLATION ERROR (mm) | ANGLE ERROR (°) |
|---|---|---|
| 1 | 38 | 0.70 |
| 2 | 26 | 0.86 |
| 3 | 61 | 0.32 |
| 4 | 20 | 0.26 |
| 5 | 20 | 0.43 |
| AVERAGE | 34 | 0.51 |

|  | DIAMOR | | ATC | | SUPER MARKET | |
|---|---|---|---|---|---|---|
|  | INLIERS | OUTLIERS | IMLIERS | OUTLIERS | INLIERS | OURLIERS |
| AFTER GROUP MATCHING | 78.3 % | 21.7 % | 66.8 % | 33.3 % | 71.6 % | 28.4 % |
| GENERALIZED HOUGH TRANSFORMATION | 97.0 % | 3.0 % | 94.3 % | 5.7 % | 91.9 % | 8.1 % |
| RANSAC | 99.6 % | 0.4 % | 99.3 % | 0.8 % | 99.1 % | 0.9 % |

CALIBRATION APPARATUS, CALIBRATION METHOD AND CALIBRATION PROGRAM

TECHNICAL FIELD

The present invention relates to a calibration apparatus, calibration method and calibration program, and more specifically, relates to a calibration apparatus, calibration method and calibration program, performing calibration of positions and directions of two or more range sensors that are installed in certain environment.

BACKGROUND ART

A laser range finder (LRF), which is a kind of a range sensor, is a noninvasive sensor that can be used for anonymous tracking for a pedestrian with high precision in social environment.

For a pedestrian tracking, a laser range finder has many advantages over a sensor of other types.

First, noninvasiveness thereof is a large advantage.

Furthermore, a use of hardware such as a floor pressure sensor may be destructive to public and business district, and a requirement to make people carry with a tag or a portable device will often demand to actively intervene in a social system that is a target for research.

On the other hand, although a video is sometimes used as a tracking tool, the LRF provides far high measurement precision and data processing required is far fewer.

Furthermore, the LRF outputs only anonymous distance information and a concern over privacy is less than a video camera.

Although these advantages must be weighed against a cost of the sensor, even if taking such a point into consideration, the LRF is a popular tool for analyzing action of a human in the public space of high traffic.

It is important that a human tracking system provides exact data consistently, and appropriate calibration of a sensor position is indispensable to it.

An example of a conventional calibration apparatus of a range sensor is disclosed in the patent literature 1. In a movable body position estimation system disclosed in this patent literature 1, a distance to a movable body is measured by each of three or more range sensors that are dispersed mutually in a measurement area, and a position estimation calculation apparatus acquires a sensor measurement value at an arbitrary time from each of the range sensors, and stores them. Distance reliability that indicates a degree of reliability according to the distance is applied to the sensor measurement value that is acquired and stored of each of the range sensors, and positions of the range sensors and the movable body are estimated with using the measurement values having high reliability out of the sensor measurement values that is acquired and stored. Furthermore, position estimation processing performs calibration of the position of each of the range sensors and estimation of a moving position of the movable body with using the sensor measurement values obtained from the two or more range sensors at positions before and after movement of the movable body.

However, since an initial value of each sensor position is required when calculating each sensor position in the movable body position estimation system of the patent literature 1, whenever environment to measure changes, for example, it is necessary to measure the initial value, and it is troublesome.

In order to cope with such a problem, a patent literature 2 discloses a calibration apparatus that can perform calibration of positions and directions of a plurality of range sensors installed in certain environment even if not giving an initial value, for example.

In a technology disclosed in this patent literature 2, a measuring apparatus includes a computer, and a plurality of range sensors are connected to the computer. Based on an output from each sensor, the computer detects a human observation point for each sensor, and calculates a human moving locus from a time change of the human observation point. Next, the moving loci calculated based on outputs of respective sensors are made to be agreed with each other between the sensors. Two human observation points on the agreed moving locus are extracted according to a predetermined rule, and a distance between the sensors that produce the agreed moving locus with using them and restriction between the sensors about relative angles are calculated for each set of the sensors that the moving loci are agreed with each other. Then, using the restrictions between the sensors, the positions and the directions of all the sensors are estimated and the estimated positions are adjusted.

CITATION LIST

Patent Literature

Patent literature 1: Japanese patent application laying-open No. 2010-127650
Patent literature 2: Japanese patent application laying-open No. 2012-88135

SUMMARY OF INVENTION

Technical Problem

A technology disclosed in the patent literature 2 is fit to calibration for environment with relatively little number of pedestrians, or for an area that moving loci of the pedestrians become to specific shapes, respectively.

However, although work for calibration becomes more important for consistency of the data obtained from a plurality of range sensors as the number of the range sensors installed in a certain area is made to be increased, for example, it becomes more difficult to perform the work by hands.

Furthermore, if a space where the range sensors are installed is a corridor, for example, shapes of all the human moving loci become resembled closely, and therefore, there is a problem of being hard to perform a calibration in environment that a plurality of persons are walking simultaneously.

The present invention is made in order to solve the above-described problem, and its object is to provide a calibration apparatus, calibration method and calibration program, capable of reducing a work load to perform calibration of positions and directions of a plurality of range sensors when the plurality of range sensors are installed in a certain area.

Another object of the present invention is to provide a calibration apparatus, calibration method and calibration program, capable of performing calibration of positions and directions of the range sensors without affecting activity of human being in an area that is a target for measurement when the plurality of range sensors are installed in a certain area.

Solution to Problem

One aspect of the present invention is a calibration apparatus for performing calibration of positions and directions of a plurality of range sensors installed in an area, each of the plurality of range sensors measuring a distance between two points in a noncontact manner, comprising: an interface device configured to receive measurement data from each of the plurality of range sensors; a storage device configured to store the measurement data from each the range sensor in a time series; and an arithmetic processing unit configured to perform the calibration based on the measurement data, wherein the arithmetic processing unit is configured to a) detect a position of moving objects in the area for each of the plurality of range sensors; b) identify a set of group candidates and pose invariant features of the group candidates, each the group candidate being identified as a group among the objects that are detected for each the range sensor; c) i) calculate a relative positional relationship between pair of the range sensors by identifying a set of objects observed in common for each the range sensor based on the group candidates of objects and the pose invariant features of the group candidates, and ii) adjust the relative positional relationship so as to minimize positional errors of the objects observed in common for each the range sensor; and d) perform calibration of the positions and directions of the plurality of range sensors in a network of the plurality of range sensors based on the position of the object observed in common with the minimized positional errors.

Preferably, in order to perform processing for adjusting the relative positional relationship, the arithmetic processing unit comprises; a group matching portion configured to perform matching a first group candidate and a second group candidate to each pair out of the plurality of range sensors based on the pose invariant features, the first and second group candidates being respectively measured by the pair of the plurality of range sensors; a pair position hypothesis calculation portion configured to calculate a primary relative positional relationship between for each pair of the range sensors based on the positions and the directions of the candidates of the objects detected by each of the sensors, the detected candidates of the objects being identified as moving in a unique group among matched the first group candidate and the second group candidate; and a robust estimation portion configured to robustly estimate a secondary relative positional relationship between the pair of range sensors by adjusting the primary relative positional relationship with rejecting outliers through matching the detected objects for each pair of the plurality of range sensors, and calculate the positions of the object observed in common with the minimized error.

Preferably, the pose invariant features of the group candidates includes the number of the objects included in the group candidates, a moving direction of the group candidates and a position of each object with respect to a geometrical center position of the group candidates.

Preferably, in order to perform processing that identifies the pose invariant features of the group candidates, the arithmetic processing unit comprises: an enumeration portion configured to enumerate a subgroup each having at least two objects included in the candidate group of the objects detected as a group; and an identifying portion configured to identify the pose invariant features for each the subgroup, wherein the group matching portion performs matching for each the subgroup.

Preferably, the pair position hypothesis calculation portion includes a calculation portion configured to calculate a relative positional relationship between the pair of the sensors in a local coordinate of each the pair of range sensors based on the matched first group candidate and the second group candidate; and a vote portion configured to perform vote processing to a bin each representing the relative positional relationship of the pair of sensors with respect to all the matched group candidates so as to identify the relative positional relationship with the most vote as the primary relative positional relationship, the bins being discretely defined in said local coordinate.

Preferably, the vote portion is configured to perform the vote weighted by consistency metric, wherein the consistency metric is defined as a total number of the objects having positions that are determined to be matched after transformation by the relative positional relationship, and the number of the objects in the matched the first group candidates and the second group candidates are excluded from the total number of the objects.

Preferably, the robust estimation portion is configured to perform estimation of the secondary relative positional relationship by RANSAC (random sample consensus).

Preferably, in order to perform calibration of the positions and the directions of the plurality of range sensors, the arithmetic processing unit comprises: a portion configured to i) combine into a constraint matrix the position of the inliers of the object observed in common corresponding to the secondary relative positional relationship to a constraint matrix for each pair of the range sensors, and ii) perform the calibration of the positions and the directions of each of the plurality of range sensors by solving the constraint matrix to the relative positions of all the plurality of range sensors under calibration.

Preferably, each of aid plurality of range sensors is a two-dimensional laser range finder that detects a distance from a sensor position to the object for each predetermined angle.

Another aspect of the invention is a calibration method for performing calibration of positions and directions of a plurality of range sensors installed in an area, each of the plurality of range sensors measuring a distance between two points in a noncontact manner, comprising steps of: detecting a position of moving objects in the area for each of the plurality of range sensors; identifying a set of group candidates and a pose invariant features of the group candidates, each of the group candidate being identified as a group among the objects that are detected for each the range sensor; calculating a relative positional relationship between each pair of the range sensors by identifying a set of objects observed in common for each pair of the range sensor based on the group candidates and the pose invariant features of the group candidates; adjusting the relative positional relationship so as to minimize positional errors of the objects observed in common for each pair of the range sensors; and performing calibration of the positions and directions of the plurality of range sensors in a network of the plurality of range sensors based on the position of the object observed in common with the minimized positional error.

A further aspect of the invention is a calibration program for making a computer perform calibration of positions and directions of a plurality of range sensors installed in an area, each of the plurality of range sensors measuring a distance between two points in a noncontact manner, the calibration program causing the computer to perform steps of: detecting a position of moving objects in the area for each of the plurality of range sensors; identifying a set of group candidates and an pose invariant features of the group candidates, each the group candidates being identified as a group among the objects that are detected for each the range sensor; calculating a relative positional relationship between each pair of the range sensors by identifying a set of objects observed in common for each pair of the range sensor based on the group candidates of objects and the pose invariant features of the group candidates; adjusting the relative positional relationship so as to minimized positional errors of the objects observed in common for each pair of the range sensor; and performing calibration of the positions and directions of the plurality of range sensors in a network of the plurality of range sensors based on the position of the object observed in common with the minimized error.

Advantageous Effects of Invention

According to the present invention, when a plurality of ranges sensor are installed in a certain area, it is possible to reduce a workload to perform calibration of the position and the direction of each of the range sensors.

Furthermore, according to the present invention, when a plurality of range sensors are installed in a certain area, it is possible to perform calibration of the position and the direction of the range sensor without affecting the activity of the human being of the area.

Furthermore, according to the present invention, even in an environment that shapes of all the human moving loci become resembled closely and a plurality of persons are walking simultaneously, it is possible to perform calibration of the position and the direction of the range sensor.

BRIEF DESCRIPTION OF DRAWINGS

FIG. 15 is a view showing a description vector of a group that is observed from each range sensor shown in FIG. 14.

FIG. 24 is a view showing a result of trial.

FIG. 30 is a view showing a confusion matrix evaluated in first to third environments, respectively.

DESCRIPTION OF EMBODIMENTS

Figure 1:
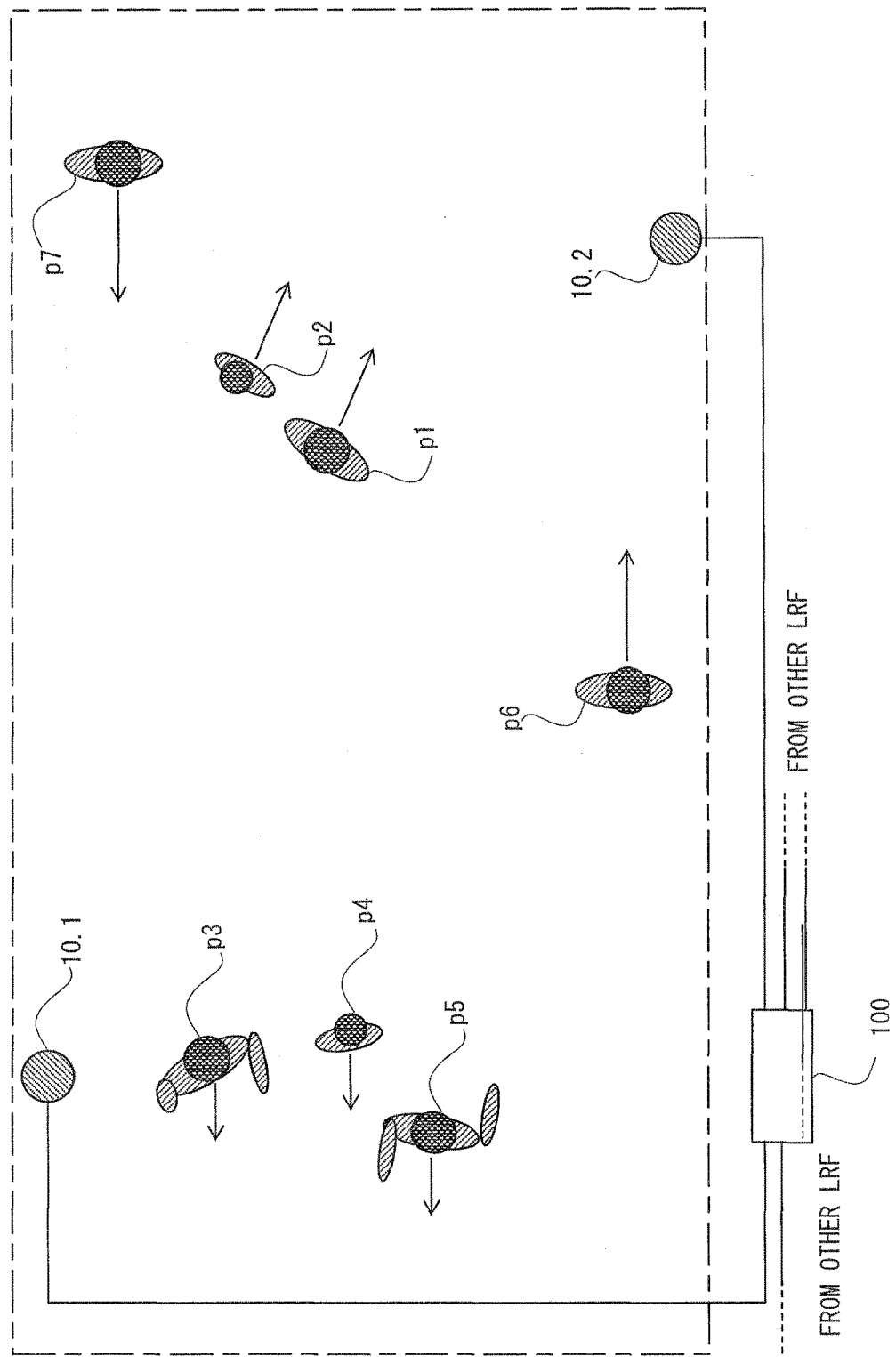
FIG. 1 is a view showing structure of a measurement system 1000 of an embodiment.

In the following, in a case where a plurality of range sensors are installed in an embodiment of the present invention, a calibration apparatus, a calibration method and a calibration program for calibrating a position and a direction of each range sensor will be described according to the drawings. It should be noted that in the following embodiment, components and processes denoted by the same reference numerals or symbols represent the same or corresponding to each other, and when not required, a description is not repeated.

Furthermore, although a laser range finder that performs a two-dimensional scan will be described as an example of a range sensor in the following description, the present invention is not limited to such a range sensor and is also applicable to a range sensor for measuring a distance to an object under the other principle, and the present invention is also applicable to a case where distance measurement by a range sensor is performed in three-dimensionally.

Description of Embodiment

FIG. 1 is a view for explaining structure of a measurement system 1000 according to the embodiment.

FIG. 1 shows a state where a plurality of range sensors 10.1-10.$n$ (n: natural number more than 2) are installed in a predetermined area, e.g., a partial area of a shopping center. In FIG. 1, two range sensors 10.1 and 10.2 are shown typically. Furthermore, in the measurement system 1000, a measurement arithmetic unit 100 for performing target tracking and specific processing is also installed. Here, although the range sensor may be a measurement device that measures a distance between two points in a noncontact manner, in the following, it will be described that each of the range sensors 10.1-10.$n$ is a laser range finder as described above.

In FIG. 1, persons p1-p7 are walking in a predetermined observation area, i.e., a partial area of the shopping center. It is assumed that among these, pedestrians p1 and p2 are moving as a single group, and pedestrians p3-p5 are also moving as a single group.

Furthermore, although not limited in particular, the measurement arithmetic unit 100 can be implemented by a general-purpose computer, and is connected with the laser range finders 10.1-10.$n$ via an interface of a predetermined standard. Although all the laser range finders 10.1-10.$n$ are connected to a single measurement arithmetic unit 100 in the example of FIG. 1, processing may be shared by two or more computers that are connected to each other by a network such as a LAN. In that case, any one computer should just function as a control computer, for example.

Furthermore, in the example of FIG. 1, in order to track a target in the predetermined observation area, n laser range finders 10.1-10.$n$ are provided, but this is mere exemplification. Therefore, the number of the laser range finders can be suitably changed according to a size and shape of the area, and the numbers and positions of obstacles. The laser range finders 10.1-10.$n$ are arranged at positions capable of detecting a moving object in the observation area such as a building, and each of the laser range finders 10.1-10.$n$ is arranged in a manner that detectable areas of at least two or more laser range finders 10.1-10.$n$ are overlapped with each other.

Each of the laser range finders 10.1-10.$n$ irradiates a laser to an object, and measures a distance to the object concerned based on a time until the laser reflected by the object and returns to it. A laser that is irradiated from a transmitter (not shown) is reflected by a rotary mirror (not shown) to scan a front by a predetermined angle (e.g., 0.5 degrees) in a fan shape.

Here, a measuring range of each of the laser range finders 10.1-10.$n$ is shown by a shape of semi-circle with a radius R (fan shape). That is, each of the laser range finders 10.1-10.$n$ can measure, when its front direction is assumed as a center, in directions of a predetermined angle range, e.g., 90 degrees of each of right and left sides within a predetermined distance (R).

Furthermore, a laser to be used is a class 1 laser defined in Japanese Industrial Standards JIS C 6802 "safety standard of laser products", and is a safe level not to have influence on the eye(s) of a human being.

Figure 2:
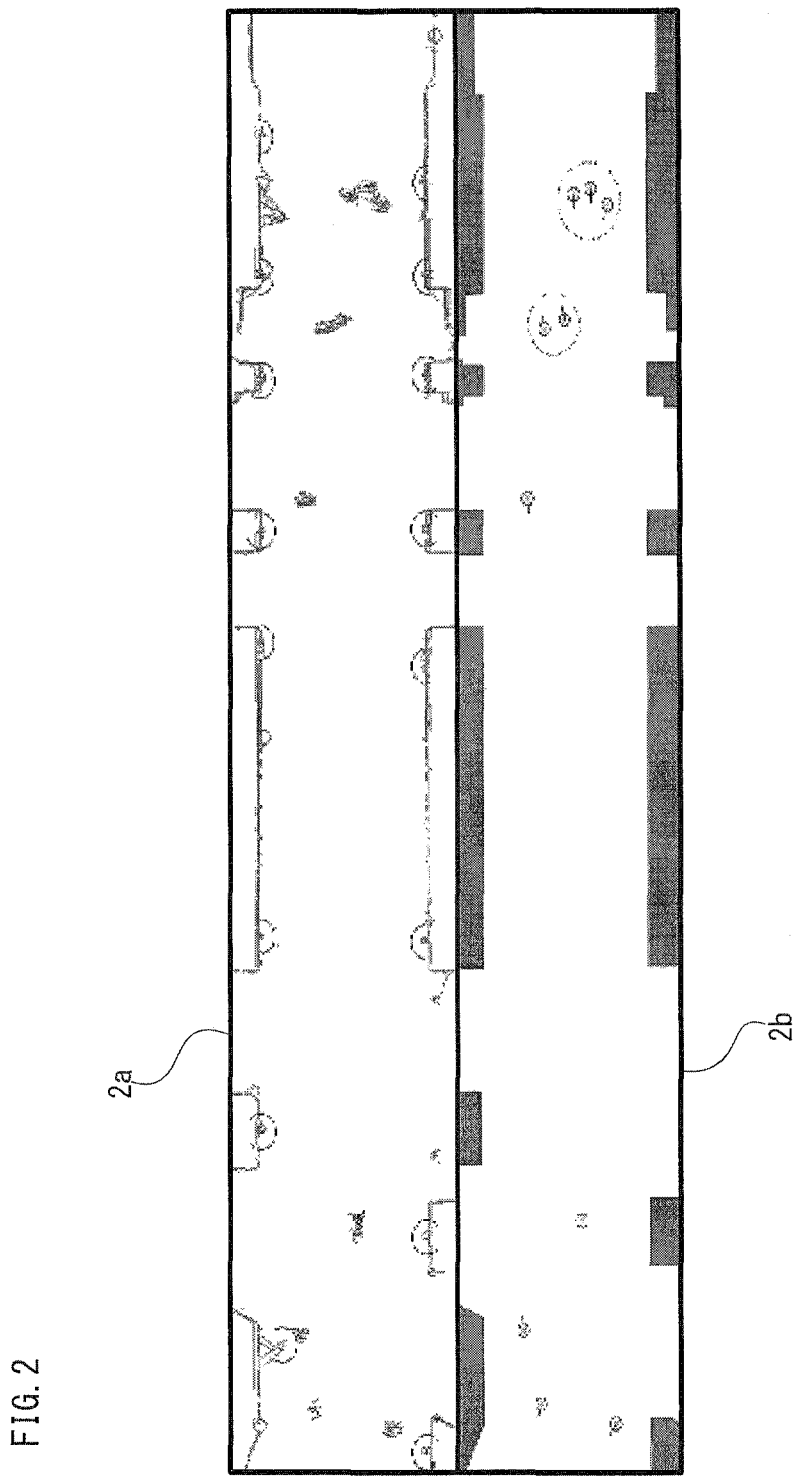
FIG. 2 is a view showing an example of distance measurement data by an LRF in a predetermined area that is an observation target.

FIG. 2 is a view showing an example of measured distance data by the LRF in the predetermined area that is the above-described observation target.

In FIG. 2, FIG. 2*a* in an upper section shows raw data measured by the range sensor, and FIG. 2*b* in a lower section is a view showing a detection result of objects under movement except for a fixture(s) of a background.

The range sensor is shown by a circle or a semicircle in FIG. 2*a*.

In FIG. 2*b*, the fixture(s) being a background is shown by gray, and detected object under movement is shown by a circle, and a moving direction is shown by a straight line added to the circle. Since a moving object is detected at a height of human waist, it is assumed that the object under movement is a person. Furthermore, an object that is identified as an object moving as a group in a time step of this measurement by a method described later is surrounded with a dotted line circle. In the following, a group that is thus assumed to move as a group because of a social relationship of a person in the environment is called a "social group".

[Hardware Block]

Figure 3:
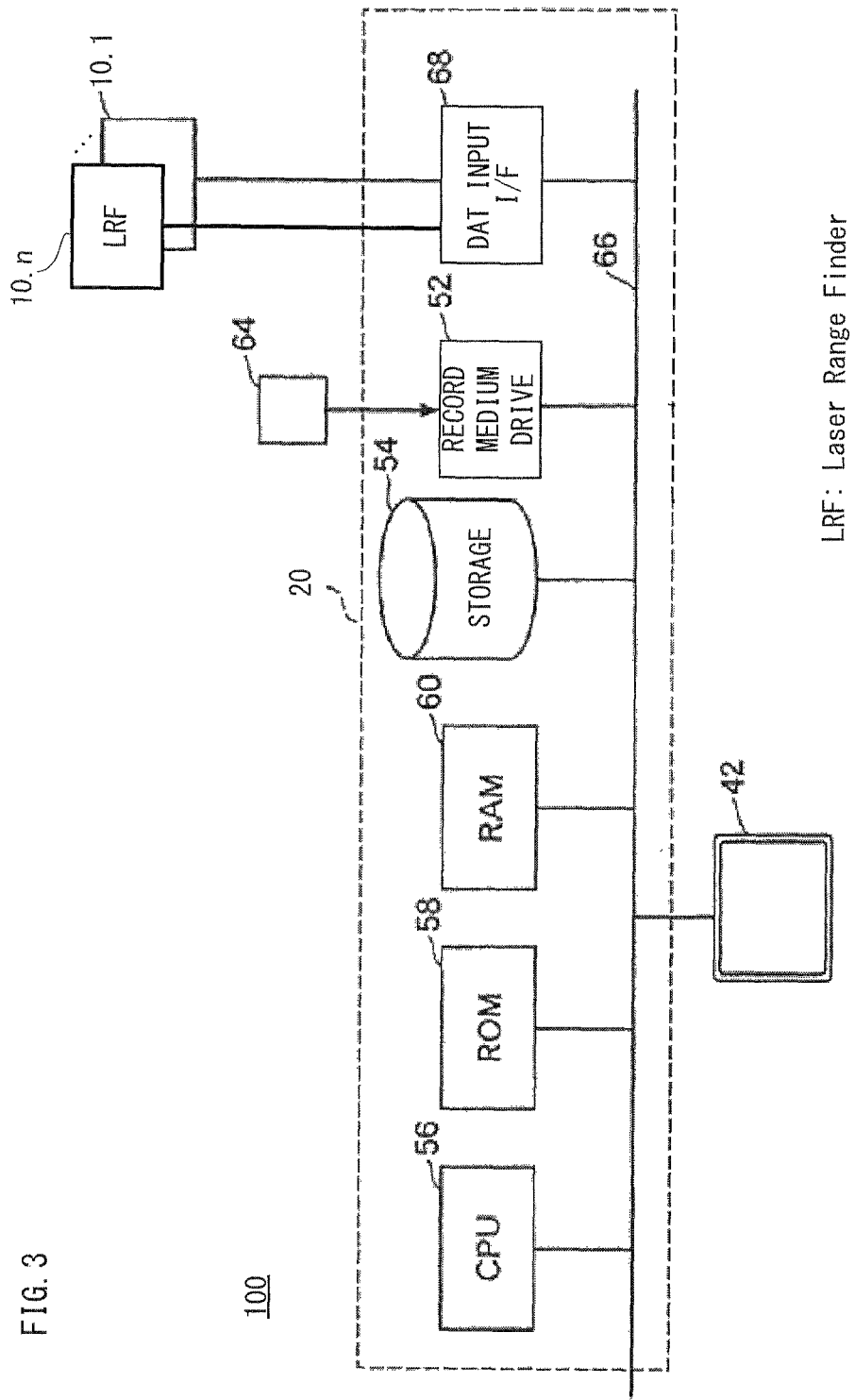
FIG. 3 is a block diagram showing hardware configuration of a measurement arithmetic unit 100.

FIG. 3 is a block diagram for explaining a hardware configuration of the measurement arithmetic unit 100.

As shown in FIG. 3, the measurement arithmetic unit 100 comprises a drive device 52 that can read data recorded on an external record medium 64, a central processing unit (CPU) 56 connected to a bus 66, a ROM (Read Only Memory) 58 and a RAM (Random Access Memory) 60, a nonvolatile storage 54 and a data input interface (hereinafter, data input I/F) 68 for fetching the measured distance data from the laser range finders 10.1-10.$n$.

As the external record medium 64, an optical disk such as a CD-ROM and a DVD-ROM, and memory card, for example can be used. However, If a device that implements a function of the record medium drive 52 is a device that can read data stored in a record medium such as an optical disk, a flash memory, etc., a target recording medium is not limited to them. Furthermore, as for a device that implements a function of the nonvolatile storage 54, if a device that can store data in a nonvolatile manner and randomly access, a magnetic storage device such as a hard disk, and a solid state drive (SSD) using nonvolatile semiconductor memories such as a flash memory as storage can also be used.

Major portions of such the measurement arithmetic unit 100 is implemented by computer hardware and software executed by the CPU 56. As to such software, in general, it is possible to adopt structure that software is recorded in a mask ROM, a programmable ROM, etc. at the time of manufacturing the measurement arithmetic unit 100, and is read into the RAM 60 at the time of execution, or structure that software is read from the record medium 64 by the drive device 52, and is once stored in the nonvolatile storage 54, and is read into the RAM 60 at the time of execution. Otherwise, when the unit concerned is connected to a network, it is possible to adopt structure that software is once copied from a server on the network into the nonvolatile storage 54, and is read from the nonvolatile storage 54 into the RAM 60 so as to be executed by the CPU 56.

The hardware itself of the computer shown in FIG. 3 and its operation principle are common. Therefore, one of the most essential portions of the present invention is the software stored in the record medium such as the nonvolatile storage 54, etc.

[Functional Blocks of System]

Figure 4:
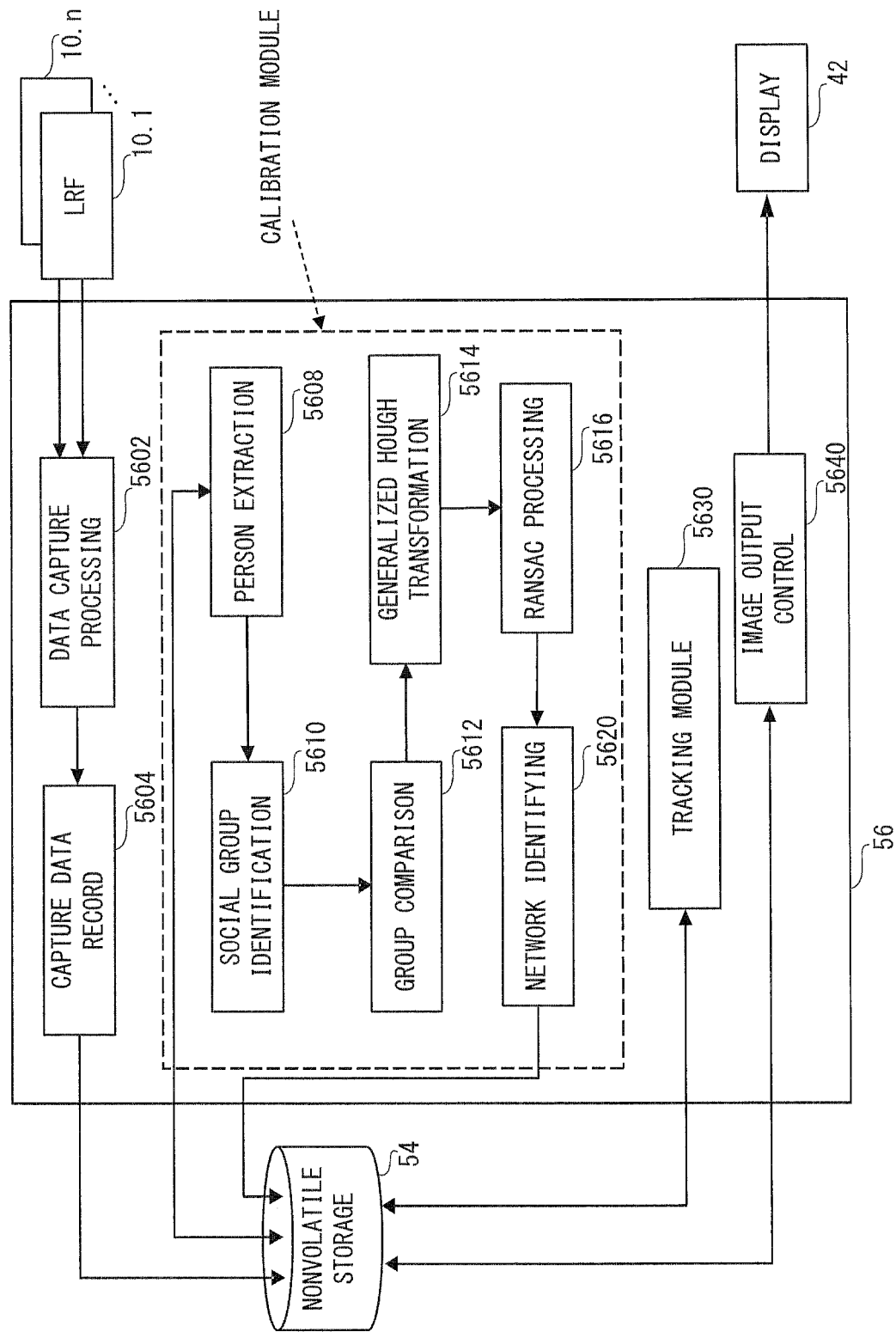
FIG. 4 is a functional block diagram showing functions of the measurement arithmetic unit 100.

FIG. 4 is a functional block diagram showing functions that the above-described CPU 56 implements by executing the software in the measurement arithmetic unit 100 of this embodiment.

In the measurement arithmetic unit 100 of this embodiment, as described in the following, a tracking module 5630 performs tracking of an object (person) based on the outputs (distance data) from the laser range finders 10.1-10.$n$. This tracking of the object is performed by estimating a position and a velocity of the object with using a technology of a particle filter etc., for example.

About processing of such tracking of an object (person), it is possible to perform by a well-known method as disclosed in the following articles, for example.

Literature: Specification of Japanese patent application laying-open No. 2013-6467

In the following, calibration procedures for preparation for performing such tracking of the object (person) will be described as those for calibrating respective positions and directions of a plurality of range sensors in a coordinate system of a sensor network including the plurality of range sensors.

In addition, a functional block(s) implemented by the CPU 56 out of the functional blocks shown in FIG. 4 is not limited to processing by software, a part or all of them may be implemented by the hardware.

With reference to FIG. 4, measured distance signals from the laser range finders 10.1-10.$n$ are input as digital data with being controlled by a data capture processing portion 5602, and stored in a storage such as the nonvolatile storage 54, for example as time series data for each laser range finder by a capture data record portion 5604. In the following, data indicative of a time when data acquisition is performed under control by the measurement arithmetic unit 100 is called a "time stamp". Although not limited in particular, the time stamp is stored in the nonvolatile storage 54 in connection to each of the measured distance data from the laser range finders 10.1-10.$n$.

Here, a time period during when it is determined, from each measured distance data with the time stamp, whether a group candidate exists in measurement targets of each laser range finder as described later is called a "time step". In the following, for simplifying, it will be described that the time step is the same timing as a time that the time stamp is applied. However, the time step may be set as a predetermined multiple of a time interval of the time stamp.

As described in the following in detail, the measurement arithmetic unit 100 further comprises a person position extraction portion 5608, a social group identification portion 5610, a group comparison portion 5612, a generalized Hough transformation processing portion 5614, a RANSAC processing portion 5616 and a network position identifying portion 5620. The person position extraction portion 5608 extracts a moving object corresponding to a person out of the measurement objects of each laser range finder, for example based on the time series data that is stored in the storage. The social group identification portion 5610 identifies a group candidate that can be identified as a group out of the moving measurement objects in each laser range finder. The group comparison portion 5612 identifies groups that are coincident (matched) with each other for each pair of the laser range finders, and calculates relative positions of each pair of the laser range finders by positions and directions of identified matched groups. The generalized Hough transformation processing portion 5614 acquires primary relative sensor position evaluation with respect to the relative positional relationship of the pair of the laser range finders by means of voting processing for matched groups for each pair of the laser range finders. The RANSAC processing portion 5616 performs, by robust estimation, re-evaluation of the object that is observed in common for the pair of the laser range finders corresponding to the primary relative sensor position evaluation while excepting outliers, and calculates secondary relative sensor position evaluation that makes minimum an error of the positions to the objects that are observed in common from each pair. The network position identifying portion 5620 produces a constraint condition described later based on the positions of the objects that are observed in common form each pair that the error of the position becomes minimum in the secondary relative sensor position evaluation, and calibrates the positions and the directions in a coordinate system defined in the network, when assuming the plurality of laser range finders as a sensor network (hereinafter, called a "network coordinate system") of the respective laser range finders, such that the error of the position in the network coordinate system becomes minimum for the objects that are observed in common from the pair, and stores a calibration result in the storage 54.

The measurement arithmetic unit 100 further comprises an image output control portion 5640 that displays detected moving object(s) with a global coordinate system while making the positions and the directions of the laser range finders consistent with a floor map (map corresponding to a measurement area) etc. based on the positions and the directions of the laser range finders stored in the storage 54.

In the following, calibration processing of a position and a direction of the laser range finder in the network coordinate system by the measurement arithmetic unit 100 will be described in more detail.

(Necessary Condition and Constraint for Identifying Position of Sensor)

At first, a premise for calibration is described.

In the following, it is assumed that respective laser range finders are installed at fixed positions.

At this time, a certain sensor cannot detect a relative position of another sensor directly due to a character of the laser range finder.

In the calibration processing in this case, available data is current and historical (time series) scan data of the distance from each range sensor.

For procedures for calibration, it is desirable that they assure enabling noninvasiveness without interference to the social environment being observed.

For example, putting a large object on the crowded commercial area may block consumers or the flow of delivery, and block a product display, or may spoil the mood and atmosphere that business is trying to support.

Even when one sensor is removed during data collection advances, for example, a use of a target that is naturally found in the environment makes possible to always and quickly re-calibrate the system with a minimum labor.

Then, in a calibration method according to this embodiment, a moving pattern of a pedestrian who moves through the environment is used as a feature for measuring a sensor position.

In the technology disclosed in the above-described patent literature 2 (Japanese patent application laying-open No. 2012-88135), a method for automatic sensor calibration based on observation of a pedestrian is proposed. Here, observation is matched between the sensors through comparison of track shapes.

This technology is effective for an environment that a locus of a pedestrian remarkably changes according to a movement in such an area including some partial areas that are turned toward different directions locally. However, trying to apply the above-described technology is not necessarily effective in a long corridor and a large social space that people have distant destinations. A reason is that since majority of loci are locally similar to a straight line in such an environment, it is difficult to distinguish the loci only based on track shapes.

Therefore, a method of calibration according to the embodiment specifies distinguishable feature other than the track shape, which enables reliable consistency of the observation about the same people from different sensors.

Furthermore, if many people are to be observed simultaneously in a large area, a heavy calculation load becomes to be required. Then, in the calibration method according to this embodiment, a procedure of matching of observation between sensors has structure of reducing a calculation load.

(Calibration Procedure of this Embodiment)

(Pattern of Movement of Pedestrian)

The calibration method according to this embodiment does not use a moving track of a pedestrian himself/herself, but uses the feature of a moving pattern that becomes to appear during a movement of the pedestrians.

When such a pattern can be observed from a plurality of observation points, they become a candidate of the feature that can be used in the calibration of a sensor position.

If such a moving pattern of pedestrians is utilized, there are following advantages.

Firstly, even when loci of majority of respective pedestrians are similar to each other in geometry, it becomes possible to identify observation that is shared between sensors.

Secondly, since it is not considered the moving loci of all the pedestrians are necessarily used as a calculation target, when the number of the pedestrians is large, in order to reduce a calculation load, it becomes possible to reduce a search space.

(Social Group)

One feature of a movement of pedestrians that is generally observed in many environments is formation of a social group.

That is, such a group is formed when pedestrians who have a certain social relationship are walking together.

For example, irrespective of whether a group is formed by people such as parents and children, group of friends, lovers or a team of business colleagues, a group can be identified because of a fact that irrespective of an external force applied to flow of the walk, members of a group come close to each other and a walking velocity is adjusted so that the members of the group stay within a predetermined range.

In the following, a description will be made about a method that can implement calibration having efficiency of calculation and robustness against noises by utilizing not a track of a pedestrian individual but a social group as a feature vector in order to take matching of observation between the sensors.

At first, since there are many identifiable features in a group rather than an individual track, it is possible to reduce a possibility of detecting erroneous matching.

Next, the social group is stable to time and provides an opportunity to filter the time series data for better noise rejection.

Lastly, since a social group can be easily detected based on momentary data in a single time frame (measured distance data corresponding to one (1) time stamp), it is a calculatively simple procedure rather than taking sufficient consistency of the tracks.

(Calibration Algorithm)

Figure 5:
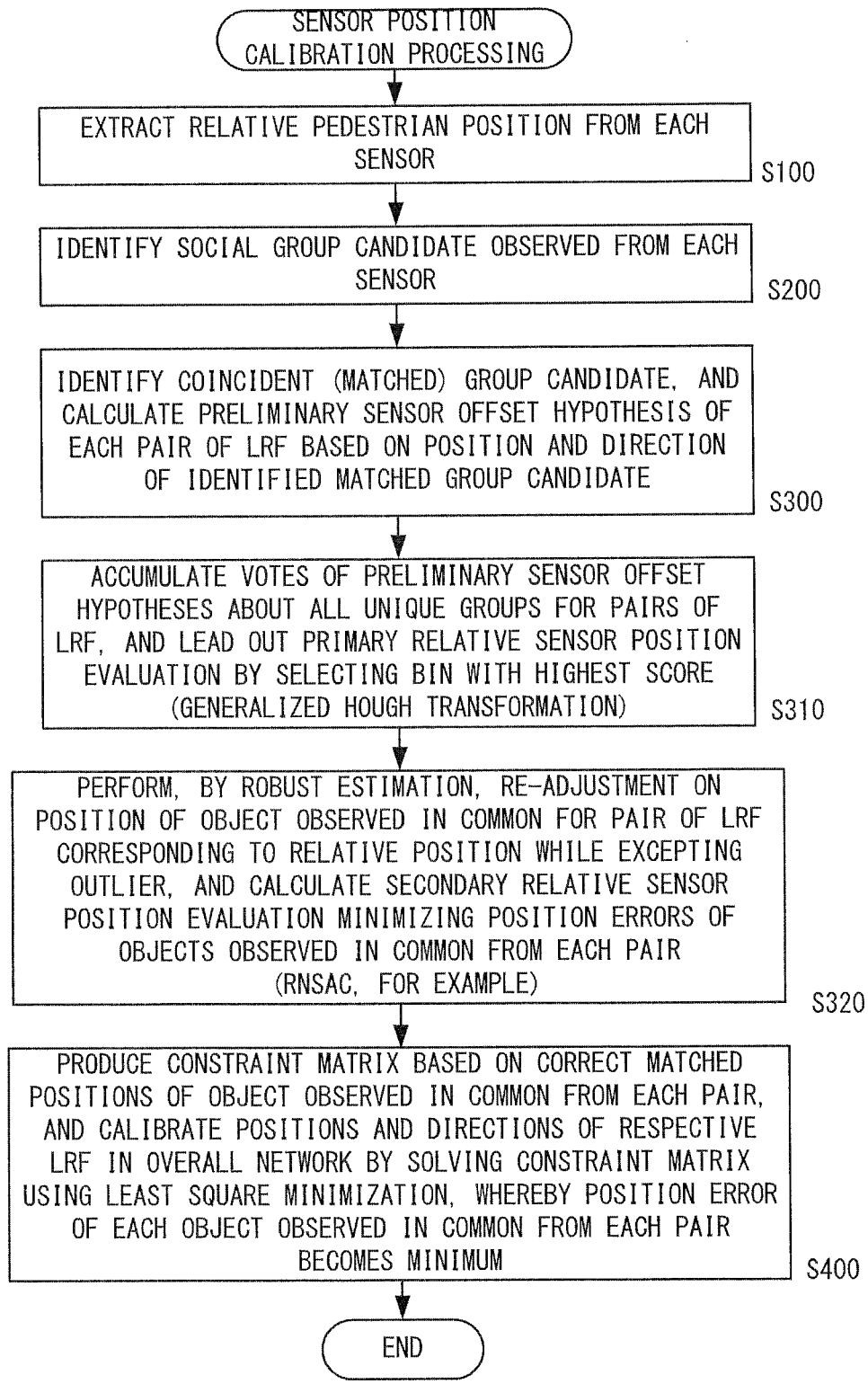
FIG. 5 is a flowchart showing a procedure of a calibration method.

FIG. 5 is a flowchart for explaining a procedure of a calibration method according to this embodiment.

Referring to FIG. 5, the person position extraction portion 5608 identifies a position of a moving object (since it corresponds to a pedestrian position basically, hereinafter, called a "pedestrian position") by using raw scan data and a background model from each sensor, and outputs relative pedestrian position data from each sensor (S100). However, typically, this position data includes many noises.

Extraction of such a person position is performed for each measured distance data corresponding to a time stamp, for example.

Next, as described later, the social group identification portion 5610 identifies a social group candidate that is observed from each sensor (S200) based on a degree of proximity of the pedestrian positions detected by each sensor at the same time (the same time stamp) and a degree of coincidence of a movement direction (coherence of the movement direction).

Subsequently, the group comparison portion 5612 normalizes groups by the movement direction for each pair of the laser range finders, compares relative positions of members, identifies a coincident (matched) group candidate, and calculates estimation of a preliminary relative positional relationship of each pair of the laser range finders ("preliminary sensor offset hypothesis") based on a position and a direction of identified group candidate (S300). Here, the term of "groups are coincident (matched)" means that group candidates concurrently observed from the pair of the laser range finders is identified as the same group.

Furthermore, the generalized Hough transformation processing portion 5614 calculates the "sensor offset hypothesis" by averaging the "preliminary sensor offset hypotheses", that is, by averaging, under the condition that one of the pair of the laser range finders is set as a reference, the positions and the directions of the other of the pair of the laser range finders in a local coordinate of the reference laser range finder with respect to a unique group that is determined to be the same group over a plurality of time steps. Then, by accumulating votes of the sensor offset hypotheses of all the unique groups for the pairs of the laser range finders in bins set up in the local coordinate, the bin with the highest score is selected (S310). Therefore, the "sensor offset hypothesis" is represented by the position and the direction of the other of the laser range finder in the local coordinate of the reference laser range finder. Furthermore, the sensor offset hypothesis corresponding to the bin with the highest score serves as primary relative sensor position evaluation. The "primary relative sensor position evaluation" is determined by vote processing to the bins as described later in detail with respect to respective pairs of the laser range finders that observe in common the unique group based on the sensor offset hypothesis for each unique group, and is calculated for each pair of the laser range finders.

Then, the RANSAC processing portion 5616 performs by robust estimation re-adjustment on the position of the object that is observed in common for the pair of the laser range finders corresponding to the primary relative sensor position evaluation while excepting outliers, and calculates secondary relative sensor position evaluation that minimizes positional errors of the objects observed in common from each pair. In addition, as far as it is robust estimation, a method that calculates the secondary relative sensor position evaluation by re-adjustment of the relative position evaluation from the primary relative sensor position evaluation such that outliers are excepted and influence of the error is made minimum may be adopted as another method other than RANSAC.

Lastly, the network position identifying portion 5620 produces a constraint matrix described later based on correct matched positions of the objects that are observed in common form each pair that the error of the position becomes minimum in the secondary relative sensor position evaluation, and calibrates the positions and the directions of the respective laser range finders in the overall network by solving the constraint matrix with using least square minimization such that the error of the position of each of the objects that are observed in common from the pair becomes minimum, and stores a calibration result in the storage 54 (S400).

In the following, processing of each step of the flowchart of FIG. 5 will be described in more detail.

(Detection of Pedestrian Position)

Figure 6:
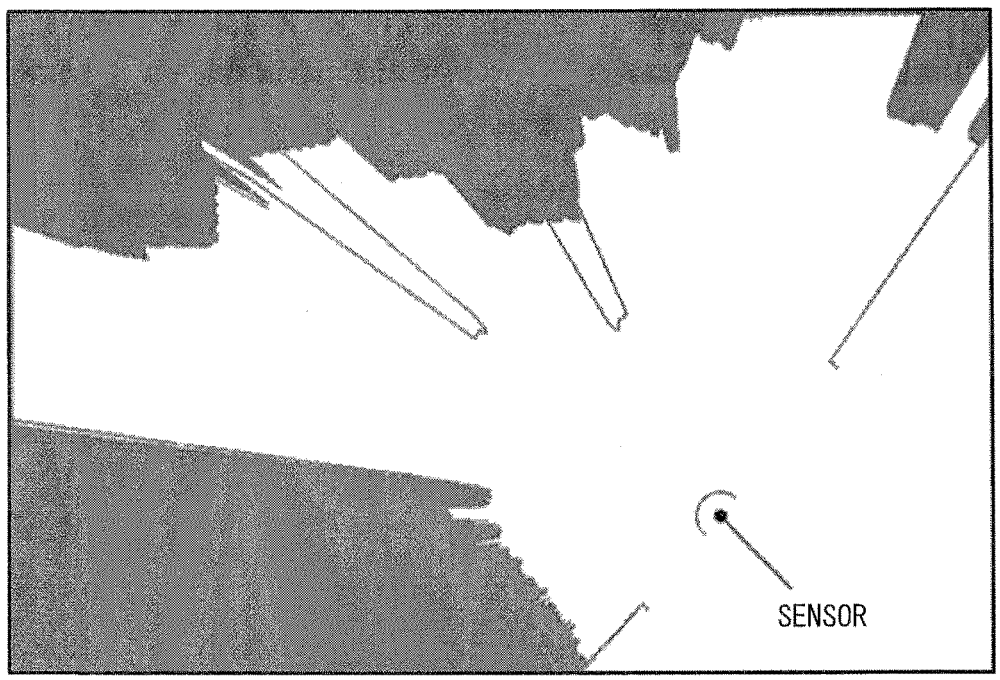
FIG. 6 is a view showing data actually observed with a laser range finder.
Figure 6:
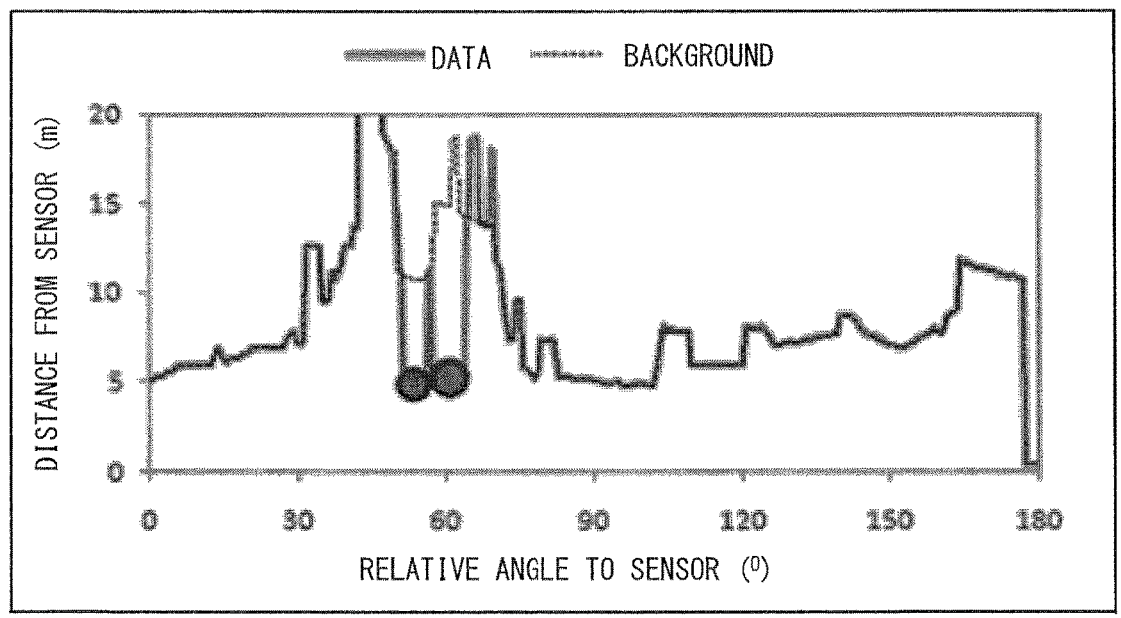

FIG. 6 is a view showing the data actually observed with the laser range finder.

Firstly, processing of detection of the pedestrian position in a step S100 of FIG. 5 will be described.

As shown in FIG. 6(a), a background scan is constructed in order to model a portion fixed in an environment. In FIG. 6(a), a background area is shown by gray and two pedestrians are detected.

A set of observation distance is collected for each scanning angle over several scans, and a distance most frequently observed over observation time is used in order to construct a background model.

(Extraction of Human Position from Scan Data)

As shown in FIG. 6(b), each data scan is divided into segments in order to extract the human position.

Scan of the height of the waist is used for this system for the simplification of a process.

Preferably, a median filter may be used to scan data in order to delete an outlier and to smooth the scan data.

As a result, in the scan data, a continuous segment that exceeds 30 cm in width is extracted in a foreground. It is considered that discontinuity of 30 cm or more in depth is a segment boundary.

On the other hand, a small gap equal to or less than a predetermined width is deleted between the segments in the same or similar distance. Furthermore, a length range of a predetermined segment, e.g., a segment of 5 cm to 80 cm in width is considered to be a candidate of a position where a person exists.

For a segment that is considered as such a candidate of a human position, with using an elliptical geometric model (long axis=55 cm and a short axis=25 cm, for example), a bodily center position is determined as a function of a width of an observed body. In FIG. 6(b), for simplifying, a human position is shown by a circle.

From this step S100, a list of relative positions of persons in the local coordinate of the laser range finder is output.

Figure 7:
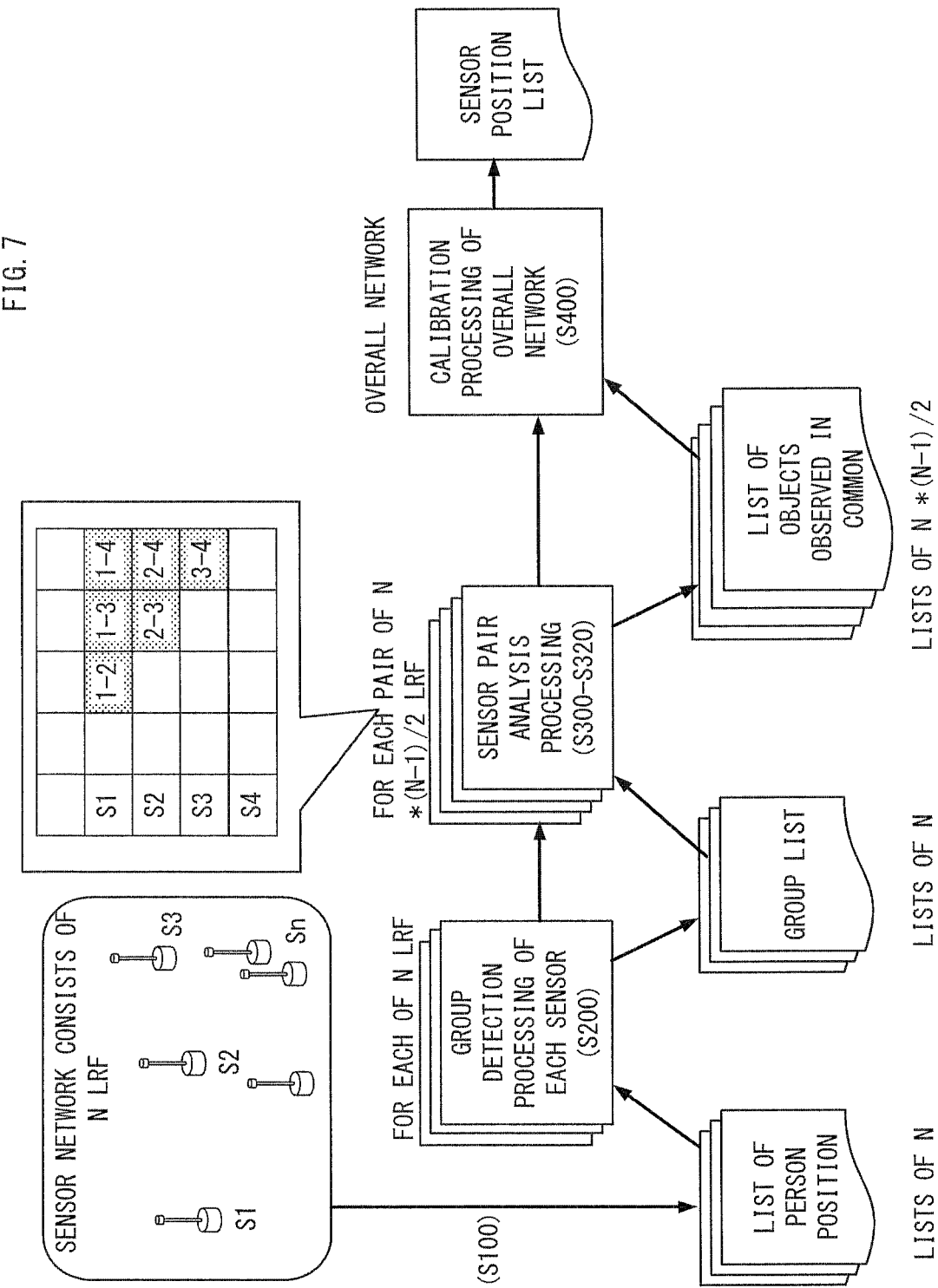
FIG. 7 is a view that the flowchart shown in FIG. 5 is rewritten as a functional block diagram.
Figure 8:
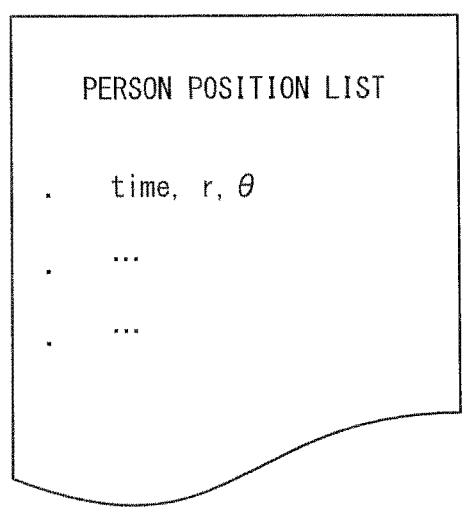
FIG. 8 is a view showing an example of data that is output by each functional block of FIG. 7.
Figure 8:
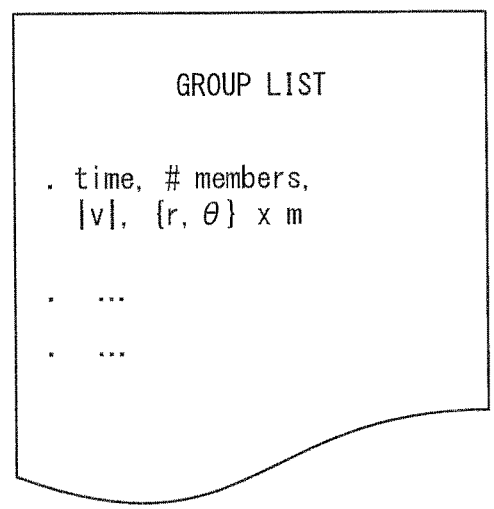
Figure 8:
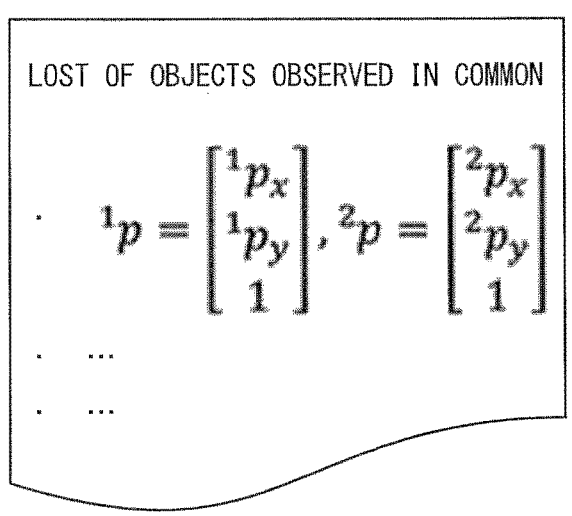
Figure 8:
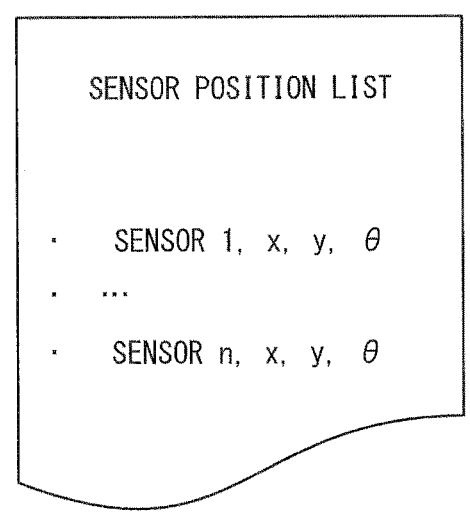

FIG. 7 is a view that rewrites the flowchart shown in FIG. 5 as a functional block, and FIG. 8 is a view showing examples of data that each functional block of FIG. 7 outputs.

With reference to FIG. 7, when considering a sensor network comprising N (n?) laser range finders, a list of relative positions of persons is produced by a procedure in the above-described step S100. Since the list of the relative positions of the persons is produced for each laser range finder, here, a list of N pieces is produced. As shown in FIG. 8, "list of relative positions of persons (hereinafter, called a "person position list")" includes, for each laser range finder, a time stamp indicating a measured time and local coordinates (here, polar coordinates (r, θ)) of a pedestrian position detected by the laser range finder.

Returning to FIG. 7, subsequently, in "group detection processing of each sensor", detection of a group candidate is performed for each laser range finder of the N laser range finders based on the person position list. This corresponds to processing of the social group identification portion 5610 of FIG. 4 or processing in a step S200 of FIG. 5. A detected group candidate is output as a group list of N pieces each corresponding to the laser range finder. Here, the group list is detected in the distance data corresponding to the same time stamp, for example. As shown in FIG. 8(b), the "group list" includes, for each laser range finder, for one group (or subgroup described later), for (m) members, a time stamp indicating the measured time, the number of members in the detected group, an absolute value |v| of a moving velocity of the group and a position (here, in a polar coordinates (r, θ)) of each member from a geometric center of the group. Here, since a center of the polar coordinate is the geometric center of the group as described above, it is possible to use the center of gravity when each member is taken into consideration by the same weight, for example, a reference of a directional component of the polar coordinate can be assumed a direction of the moving velocity of the group.

Returning again to FIG. 7, in "sensor pair analysis processing", a group that is observed in common by the pair is identified for each pair of the laser range finder based on the group list, and a relative positional relationship between the pair of the laser range finder is also identified. A position of the pedestrian observed in common from the pair of the laser range finder is identified based on the identified relative positional relationship such that a positional error is smallest. This "sensor pair analysis" corresponds to processing of steps S300-S320 in FIG. 5. The sensor pair analysis is performed with respect to combination of possible pairs of N laser range finders, a "list of objects observed in common" of N*(N−1)/2 pieces is output. When the number of the laser range finders is four (4), for example, the combination of possible pairs is 6 (=4*3/2). As shown in FIG. 8(c), in the "list of objects observed in common", for each object that is observed in common, a set of the position coordinates of the object observed in common in the local coordinates of one of the laser range finders forming the pair and the position coordinate of the same object in the local coordinate of the other of the laser range finders forming the pair is included.

Again, returning to FIG. 7, lastly, in the "calibration processing of overall network", a constraint matrix described later is produced based on the "list of objects observed in common", and calibration processing is performed by solving the constraint matrix by a least squares method to evaluate respective positions and respective directions of the N laser range finders in the overall sensor network. This "calibration processing of overall network" corresponds to processing of the network position identifying portion 5620 of FIG. 4 or a step S400 in FIG. 5.

In the "calibration processing of overall network", a "sensor position list" indicating the position and the direction of each laser range finder in the overall sensor network is output. As shown in FIG. 8(d), the position and the direction in the overall sensor network for each laser range finder are included in the "sensor position list". Although not limited in particular, "determination of position and direction in overall sensor network" means determining all of the relative positions and the relative directions of other range sensors in the sensor network on the basis of any one of the range sensors, e.g., the first range sensor. Then, the position of the object that is detected by each range sensor can be identified in the global coordinate by making the "position and direction of each range sensor in overall sensor network" consistent with the floor map etc.

In the following, processing for each functional block of each processing shown in FIG. 7 will be described.

(Detection of Pose Invariant Feature)

As described above, in this embodiment, the social group that is formed in the flow of the pedestrians is adopted as an pose invariant feature.

The social group can describe many features rather than each pedestrian track, and they are stable over time.

(Social Group as Pose Invariant Feature)

In order to use the social group as the pose invariant feature, a description vector is defined as having a characteristic that can be invariant even when the social group is observed by the laser range finder at a different position.

This description vector includes the number (n) of the members of the group, an absolute value |v| of the motion vector (if it is noted that v is defined by the sensor relative coordinates, only a magnitude thereof can be used as pose invariant feature) and a geometric description of a shape of the group.

The shape of the group can be described in an attitude invariant way as a list of the positions of the members. That is, the shape is expressed by the position of each member to a geometric center (center of gravity) of the group (or subgroup described later).

Information of this position of each member is stored in the storage 54 as vector set M={m1, m2, - - - , mn}. This vector set M={m1, m2, - - - , mn} is stored as what represents the position of each member in the polar coordinate system that has its X-axis in a direction of movement of the group and an origin that is the geometric center of the group.

(Detection of Social Group)

Figure 9:
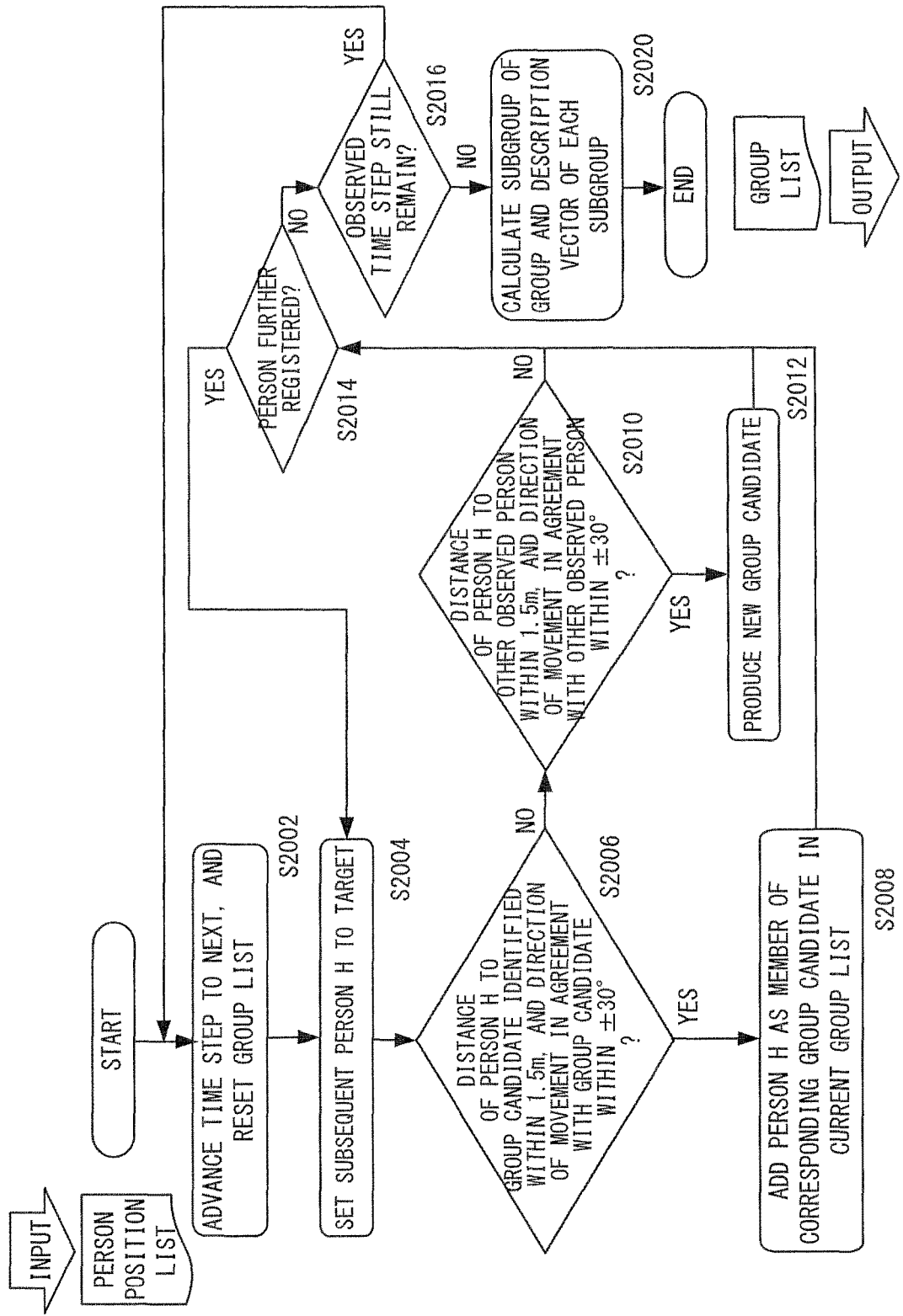
FIG. 9 is a flowchart showing "group detection processing of each sensor" of FIG. 7.

FIG. 9 is a flowchart for explaining about "group detection processing of each sensor" of FIG. 7.

More specifically, for the group detection processing at each sensor, a pedestrian set is identified as the social group on condition that a distance between detected persons is less than a predetermined distance, e.g., 1.5 m, and that directions of movement are agreed with each other (directions of movement are consistent with each other within a predetermined angle (±30 degrees, for example)).

For example, as an initial value, a time step is set as t=0 and a working variable for identifying a person H being a target for processing is also set to 0-th.

With reference to FIG. 9, if the "group detection processing of each sensor" is started, the CPU 56 advances a time step to be a target for processing, and resets a group list (S2002).

Next, the CPU 56 sets a subsequent person H in the "person position list" of the time step of a current processing target (S2004), and determines whether a distance of the person H to a group candidate having been already identified within 1.5 m and a direction of movement of the person H is in agreement with that group candidate within ±30 degrees (S2006).

The CPU 56 adds the person H as a member of the corresponding group candidate in the current group list when the distance and the direction of movement both satisfy conditions (Yes at a step S2006) (S2008).

On the other hand, when the distance and the direction of movement do not satisfy the conditions (No at the step S2006), the CPU 56 determines whether a distance of the person H to another observed person within 1.5 m and a direction of movement of the person H is in agreement with that person within ±30 degrees (S2010).

The CPU 56 produces a new group candidate in the current group list when the distance and the direction of movement both satisfy conditions (Yes at the step S2010) (S2012).

On the other hand, the CPU 56 returns a process to the step S2004 when the distance and the direction of movement do not satisfy conditions (No at the step S2010) and a person is further registered in the current "person position list" (Yes at a step S2014).

The CPU 56 determines whether there remains a observed time step (S2016) when the distance and the direction of movement do not satisfy conditions (No at the step S2010) and a person is not registered in the current "person position list" anymore (No at a step S2014).

The CPU 56 returns the process to the step S2002 when a time step still remains (Yes at the step S2016).

On the other hand, when no time step remains (No at the step S2016), the CPU 56 calculates, for each group listed in the group list, a subgroup of the group and a description vector of each subgroup (S2020).

As a result, the CPU 56 outputs the group list for each laser range finder about all the time steps. The group list is a list of all the groups observed for each range sensor in each time step.

(Listing of Subgroup for Avoiding Influence of Occlusion)

In the following, the above-described "subgroup" will be further described.

Some members of the group may be covered by another member from a perspective range of a laser range finder (called "occlusion").

Therefore, a certain group may be observed in a manner that the group has three (3) members for one laser range finder, but may have only two (2) persons for another laser range finder.

In order to cope with this possibility, the CPU 56 enumerates all the subgroups that constitute the observed group in order to use the subgroup as a candidate for performing matching between the pairs of the laser range finder.

Figure 10:
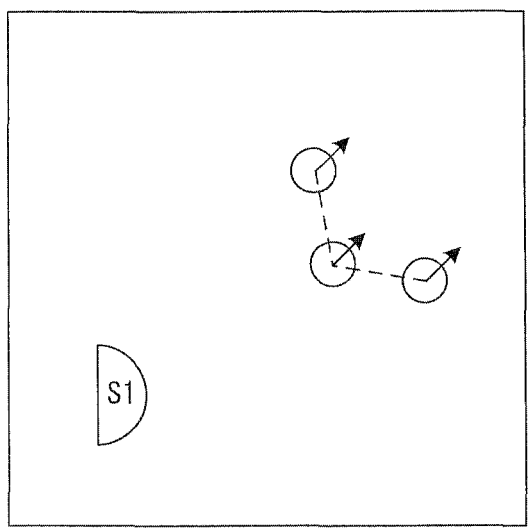
FIG. 10 is a view showing subgroups corresponding to possible occlusions and description vectors of groups.
Figure 10:
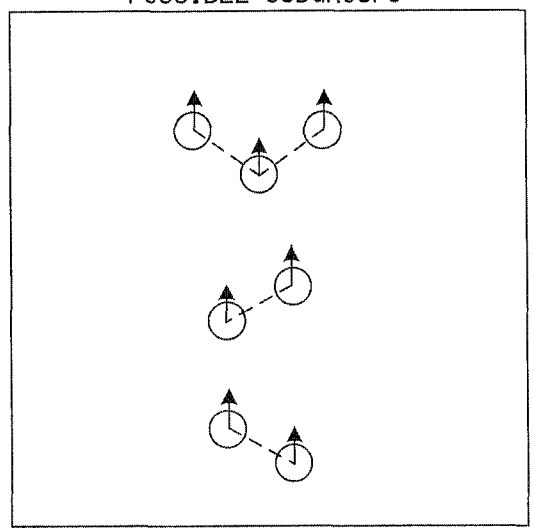
Figure 10:
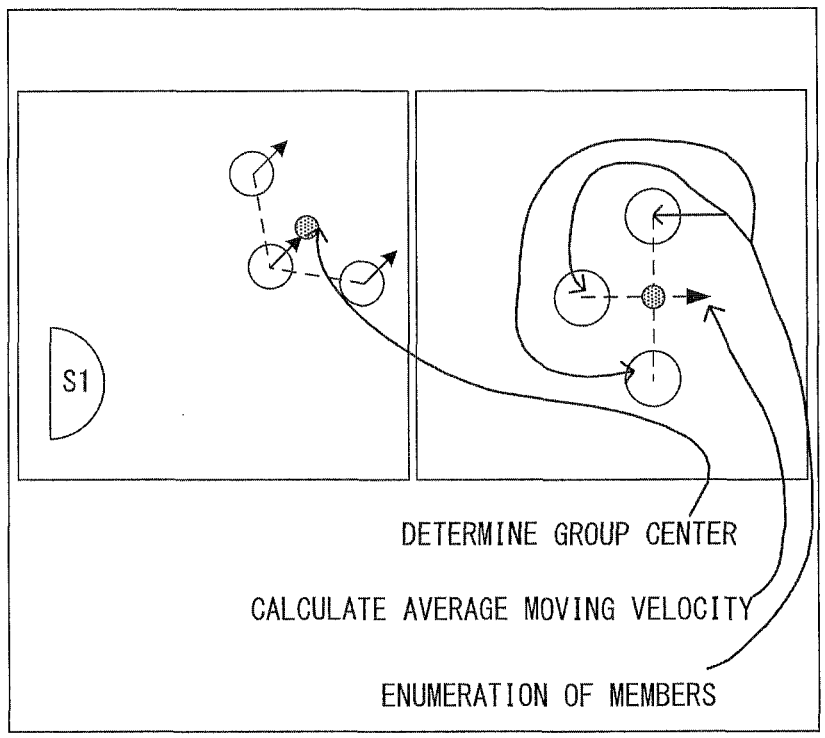

FIG. 10 is a view showing a subgroup corresponding to possible occlusion and a description vector of the group.

FIG. 10(*a*) shows a group observed with the laser range finder S1, and FIG. 10(*b*) shows enumeration of possible subgroups in the observed group. In the following, when calling simply a "group" in the matching processing etc., a subgroup of the group is also included. Furthermore, it should be noted that even when a subgroup of a certain group and another group are matched with each other or even when a subgroup of a certain group and a subgroup of another group are matched with each other, saying "groups are matched with each other".

With respect to a group of three (3) persons, an original group of three persons, a first group of two persons out of the three persons and a second group of the other two persons out of the three persons are enumerated as a subgroup dependent on a possibility of occlusion. Although there are three possible combinations for selecting two persons from three persons, since the remaining one cannot arise in occlusion, it is not enumerated in this case.

Then, as shown in FIG. 10(*c*), the CPU 56 calculates the above-described description vector for each subgroup.

In a case where a group of three persons is being observed from the pair of the laser range finder S1 and the laser range finder S2, for example, when one member is covered from the viewpoint of the sensor S2, by enumerating three possible subgroups as shown in FIG. 10(*b*), it becomes possible to identify matching between the group observed by the laser range finder S2 and the subgroup of the group observed by the laser range finder S1.

Figure 11:
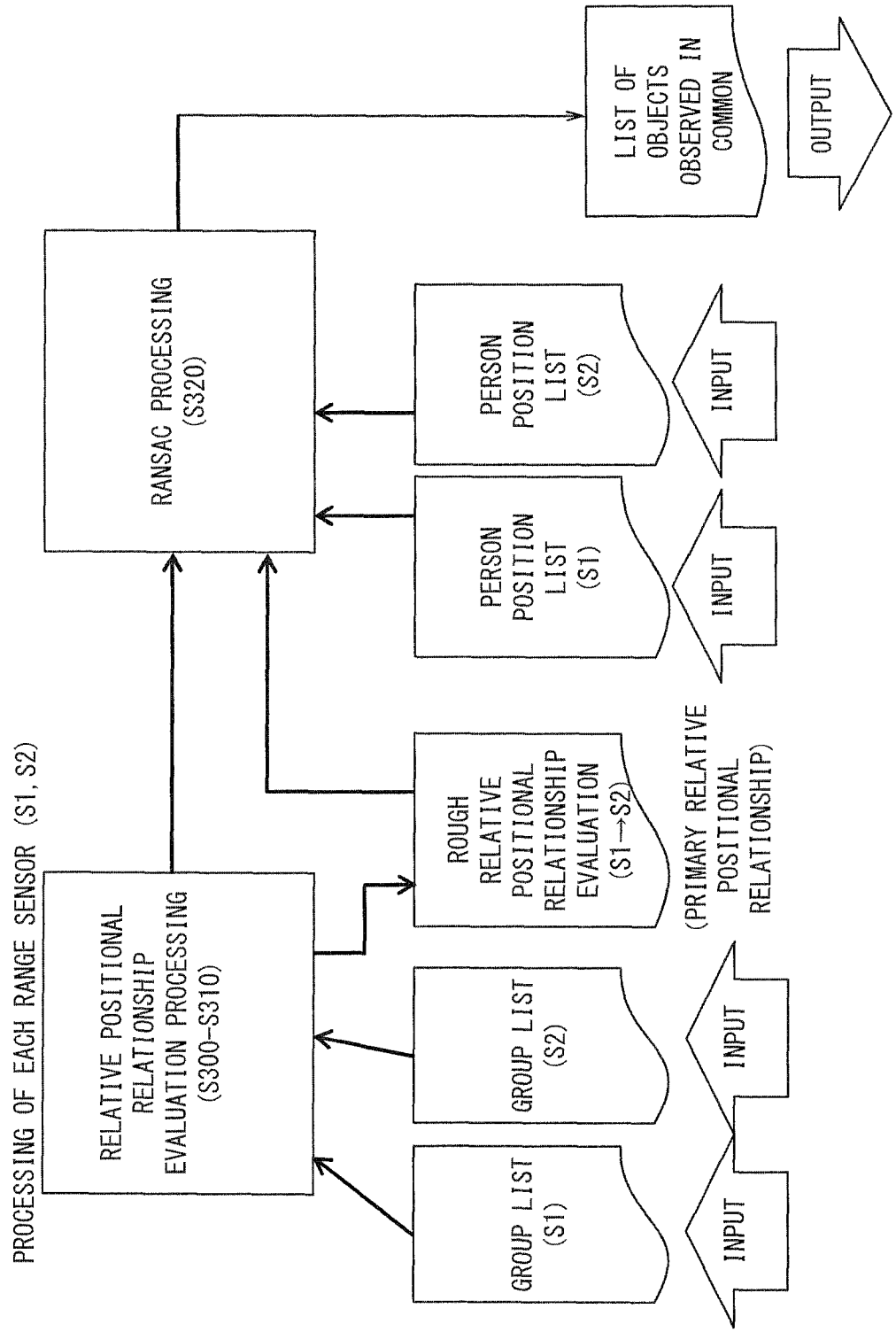
FIG. 11 is a functional block diagram showing "sensor pair analysis processing" shown in FIG. 7.

FIG. 11 is a functional block diagram for explaining "sensor pair analysis processing" shown in FIG. 7.

FIG. 11 shows exemplarily the processing about the pair of the laser range finder S1 and the laser range finder S2.

With referring to FIG. 11, in relative positional relationship evaluation processing, a result of rough relative positional relationship evaluation of the laser range finder S1 and the laser range finder S2 is output with using the group list about the laser range finder S1 and the group list of the laser range finder S2 as inputs.

The "relative positional relationship evaluation processing" corresponds to the steps S300-S310 of FIG. 5. Furthermore, a result of the "rough relative positional relationship evaluation" is called a "primary relative positional relationship".

In RANSAC processing, a "list of objects observed in common" is output by using the primary relative positional relationship and the person position list about the laser range finder S1 and the person position list about the laser range finder S2 as inputs.

The RANSAC processing is corresponding to processing of the RANSAC processing portion 5616 of FIG. 4 or processing in the step S320 of FIG. 5.

Figure 12:
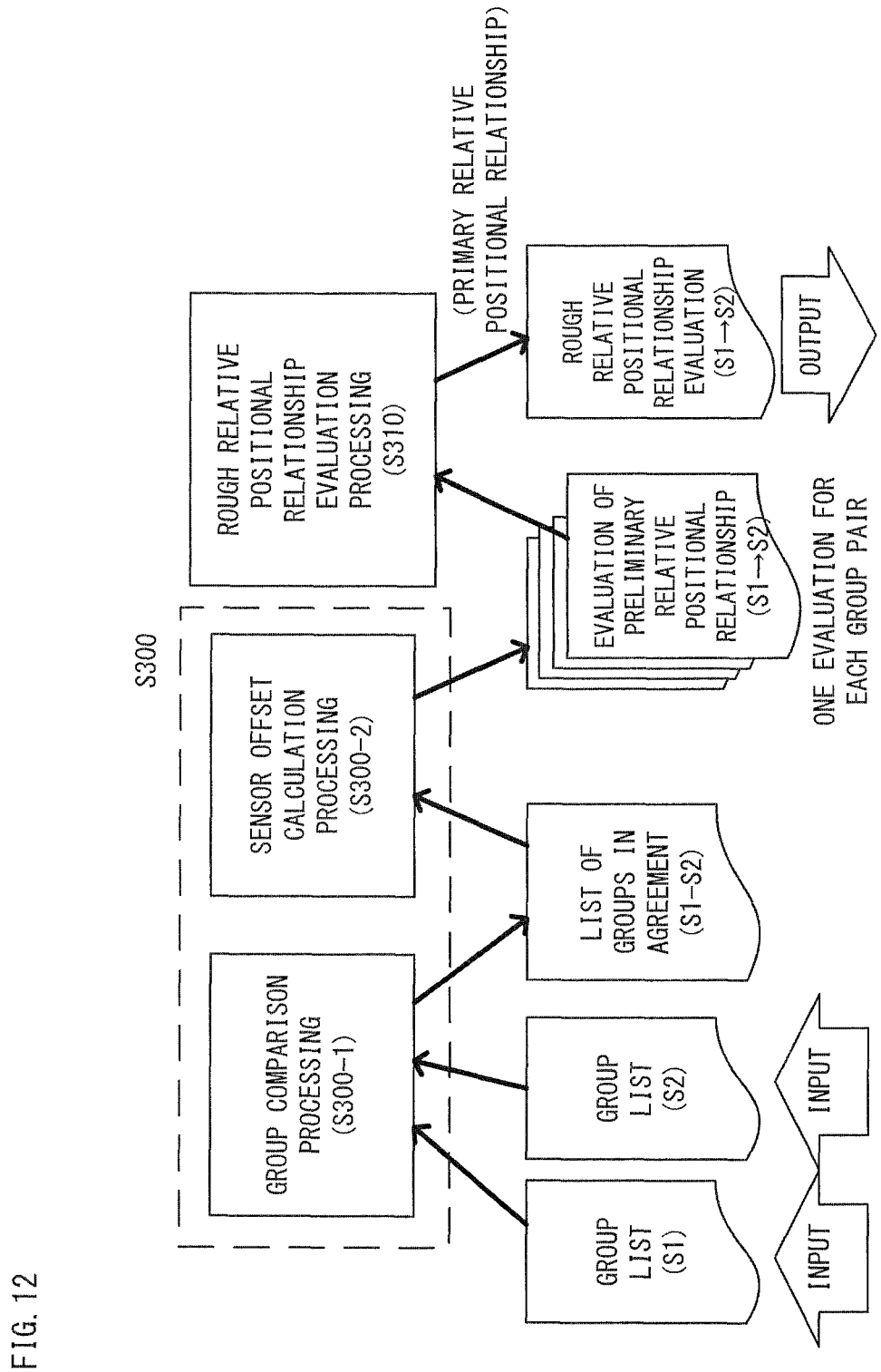
FIG. 12 is a functional block diagram showing relative positional relationship evaluation processing shown in FIG. 11.

FIG. 12 is a functional block diagram for explaining the relative positional relationship evaluation processing shown in FIG. 11.

In group comparison processing (S300-1), a "list of groups in agreement" about the pair of the laser range finder S1 and the laser range finder S2 by using the group list about the laser range finder S1 and the group list about the laser range finder S2 as inputs.

Sensor offset calculation processing (S300-2) outputs "evaluation of preliminary relative positional relationship" with respect to the pair of the laser range finder in each time step by using the list of groups in agreement as an input. In this case, the "evaluation of preliminary relative positional relationship" is calculated for each matched group pair. In addition, although not limited in particular, the "relative positional relationship" means, when considering the position of one of the pair of the laser range finders as a reference, the position and the direction of the other laser range finder in the coordinate system of this reference laser range finder. In this sense, the "relative positional relationship" is also called a "sensor offset".

A combination of the group comparison processing (S300-1) and the sensor offset calculation processing (S300-2) corresponds to the step S300 of FIG. 5.

The rough relative positional relationship evaluation processing outputs by using the "evaluation of preliminary relative positional relationship" as an input a result of the "rough relative positional relationship evaluation", that is, the "primary relative positional relationship".

Figure 13:
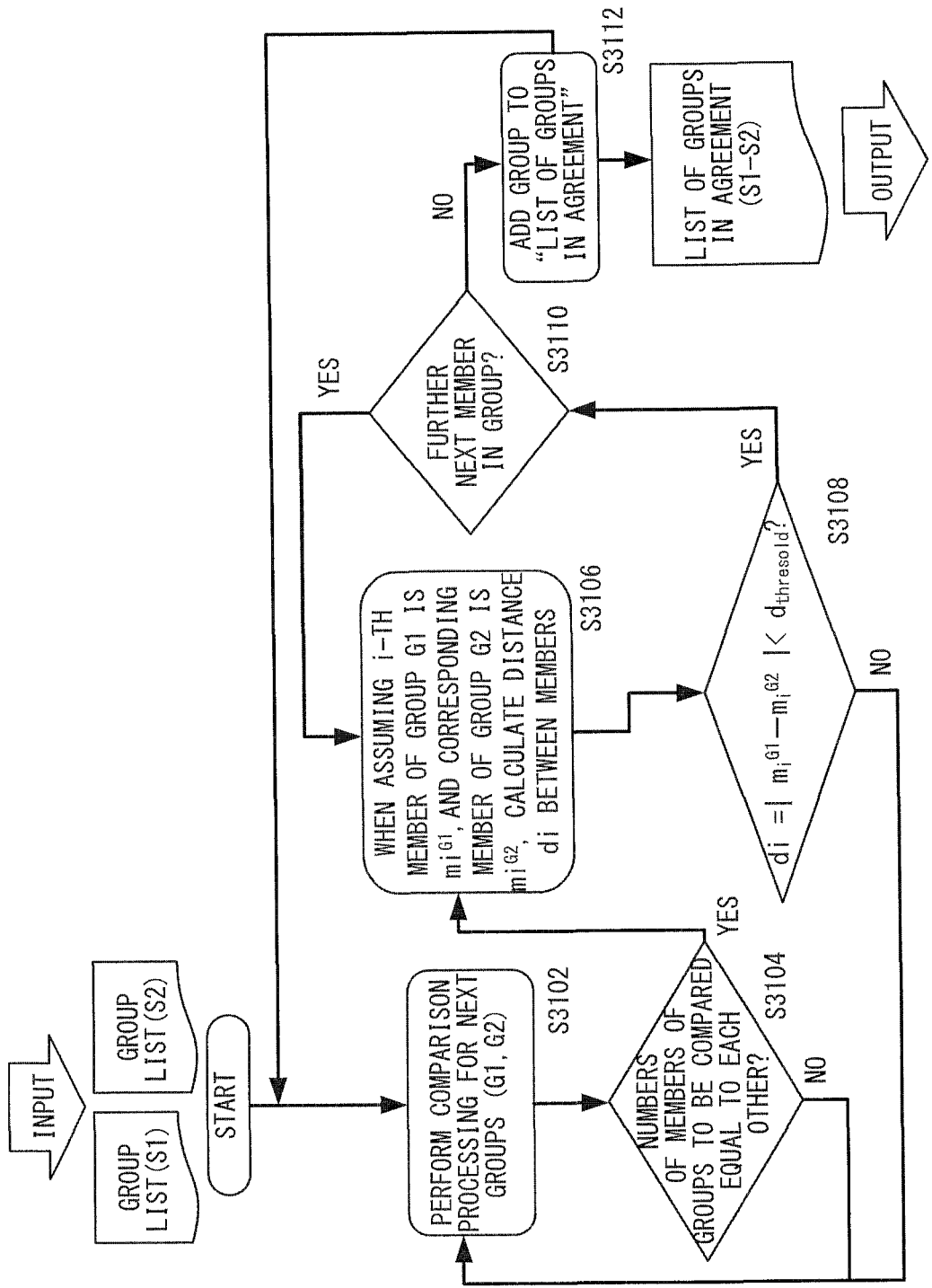
FIG. 13 is a flowchart showing a process that a CPU 56 performs in group comparison processing (S300-1).

FIG. 13 is a flowchart for explaining a process that the CPU 56 performs in the group comparison processing (S300-1).

Processing that compares groups about the pair of the range sensor S1 and the range sensor S2 will be described in FIG. 13. Here, in each time step, each group in the group list of the range sensor S1 is compared with each group in the group list of the range sensor S2. Such comparison is performed for all the range sensors.

As described above, the description vector of the group consists of the number (n) of the members, a magnitude |v| of a velocity vector and a set of member vectors M.

In evaluating a likelihood of matching between two groups (subgroups), first, only the group of the same number of the members, that is, a case of n1=n2 is taken into consideration. In addition, based on not only the number of the members of the group but also the magnitude of difference between the group velocities, filtering may be performed with a condition of $\|v1|-|v2\| < V_{threshold}$. Here, $V_{threshold}$ is a predetermined threshold value.

Here, a case where the filtering with only the number of the members of the group is performed will be described.

First, as an initial setting, both of a working variable that designates a group at the time of performing selection of a group and a working variable that designates a member in the group are set as 0 (zero).

With reference to FIG. 13, the CPU 56 performs, when starting the group comparison processing, comparison processing for next groups with using the group list about the laser range finder S1 and the group list about the laser range finder S2 as inputs (S3102). Here, groups to be compared with each other are the group G1 and the group G2. Here, the term "group" includes also a subgroup.

Subsequently, the CPU 56 determines whether the numbers of the members of the groups to be compared are equal to each other (S3104). When being not equal, the process returns to the step S3102.

One the other hand, when being equal (Yes at the step S3104), about two groups (G1, G2) being compared, it is defined that i-th member of the group G1 is $m_i^{G1}$ and corresponding member of the group G2 is $m_i^{G2}$, and then, the CPU 56 calculates a distance G2 between the members (S3106).

Here, as described above, when expressing by the polar coordinates with the reference (X axis) that is the direction of movement of the group, the numbers are applied to the members of the group a counterclockwise direction from the X axis, for example, and then, a distance about the members having the same number is calculated.

Subsequently, the CPU 56 determines whether the distance $d_i = |m_i^{G1} - m_i^{G2}| < d_{threshold}$ (S3108).

Here, $d_{threshold}$ is a predetermined threshold value.

When the distance is not shorter than the threshold value (No at the step S3108), the process returns to the step S3102.

On the other hand, when the distance is shorter than the threshold value (at the step S3108), the CPU 56 determines whether there is any further next member in the group (S3110).

When there is a next member, the process returns to the step S3106.

On the other hand, when there is no next member, the CPU 56 determines that the groups are in agreement with each other, and adds the group to the "list of groups in agreement", and the process returns to the step S3102.

If ending the comparison for all the groups, the "list of groups in agreement" is output.

In addition, although explained as "when expressing by the polar coordinates with the reference (X axis) that is the direction of movement of the group, the numbers are applied to the members of the group a counterclockwise direction from the X axis", if there is an error in the detection of the movement direction, there is a possibility that this numbering may be shifted. Then, for the two groups, first, the most proximity members are determined, and starting from the most proximity members, numbering may be performed.

Figure 14:
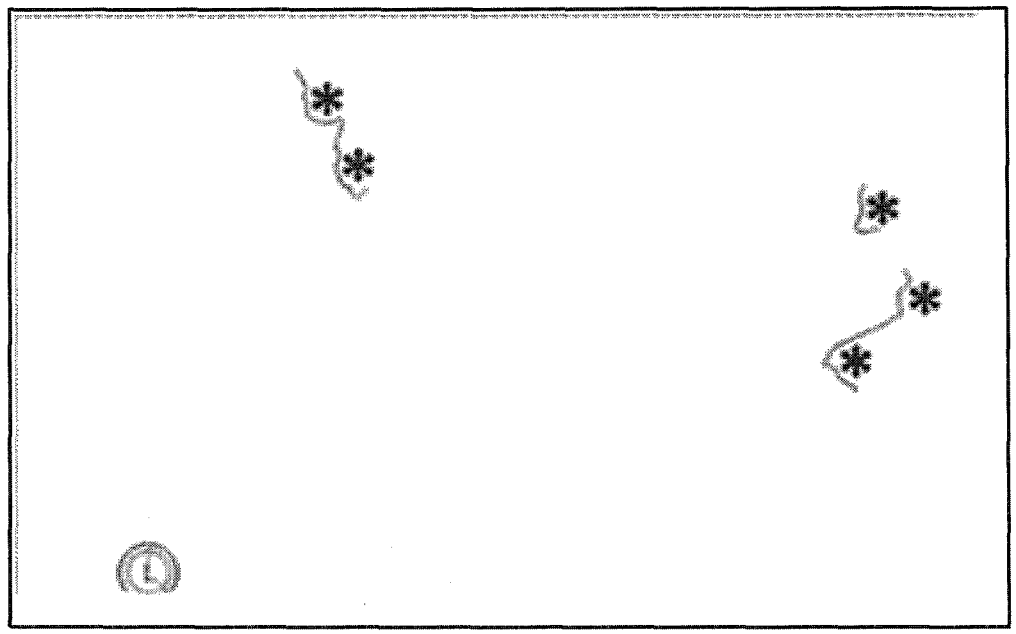
FIG. 14 is a view an example of two groups that are observed from viewpoints of two different range sensors "L" and "N".
Figure 14:
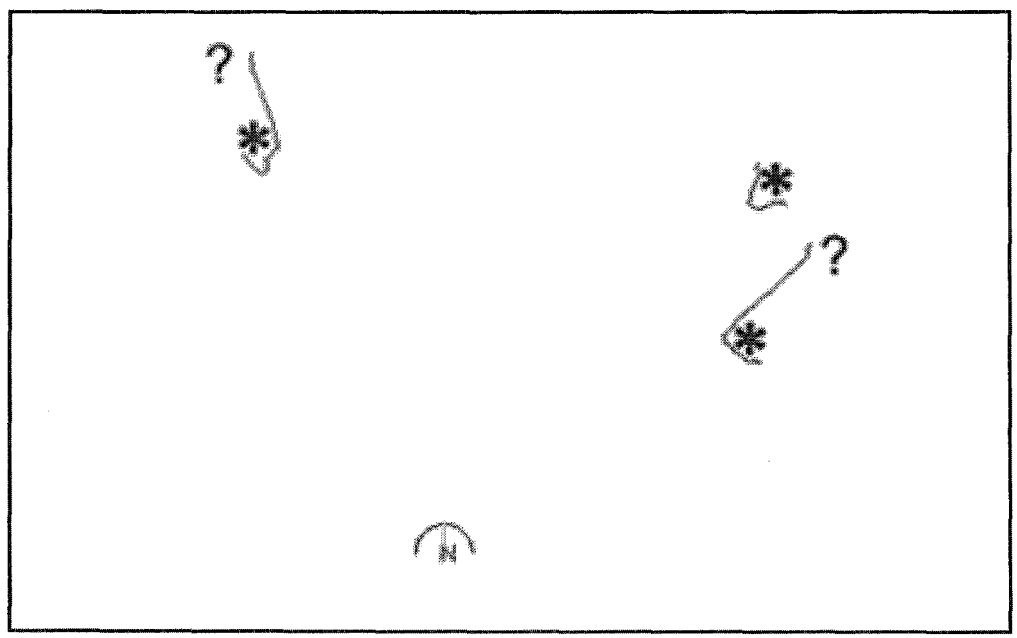

FIG. 14 is a view showing an example of two groups observed from viewpoints of two different range sensors "L" and "N".

People observed are shown by "*" and people covered are shown by "?".

In FIG. 14, two pedestrians cannot be observed from the range sensor N due to occlusion.

FIG. 15 is a view showing the description vectors of the group observed from each range sensor shown in FIG. 14.

FIG. 15 shows a state where subgroups are enumerated about the group 2 whose number of the members observed from the range sensor L is three (3) persons.

The "group 3" whose number of the members observed from range sensor N is two persons may be matched with the "subgroup 2c" of the "group 2" whose number of the members observed by range sensor L is three persons.

(Production of Hypothesis about Relative Positional Relationship)

Figure 16:
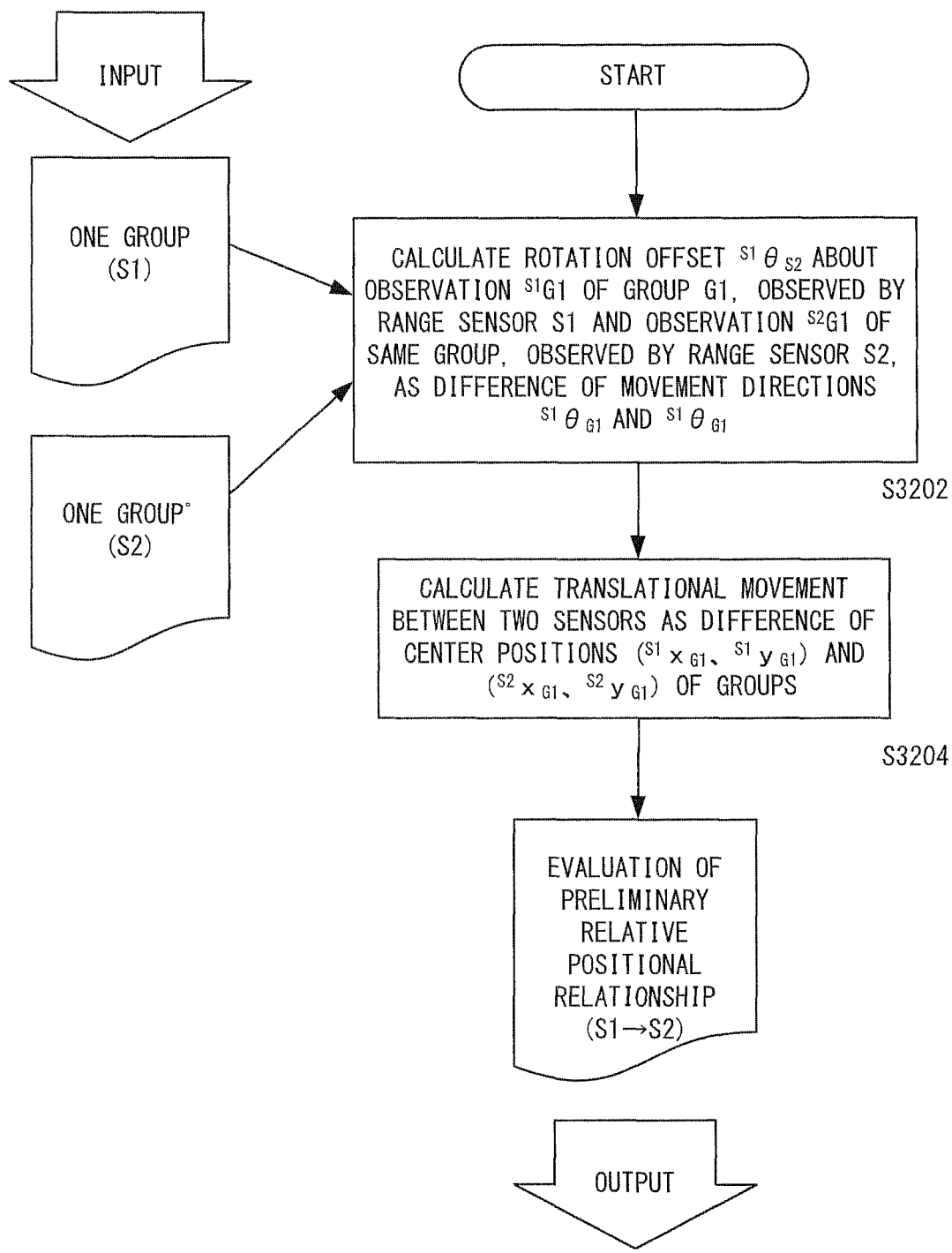
FIG. 16 is a flowchart showing a process of sensor offset calculation processing (S300-2).

FIG. 16 is a flowchart for explaining a process of a sensor offset calculation processing (S300-2).

In this sensor offset calculation processing, in a process of FIG. 13, the description vectors about the groups determined to match are input.

As an assumption, it is possible to define the sensor offset hypothesis as a form of a transformation matrix $^{S1}_{S2}H_{G1}$ about observation $^{S1}G1$ of a certain group G1 that is observed by the range sensor S1 and observation $^{S2}G1$ to the same group that is observed by the range sensor S2. That is, based on a fact that the same group G1 can be observed from the range sensor S1 and the range sensor S2, the transformation matrix $^{S1}_{S2}H_{G1}$ corresponds to a matrix that performs transformation to the local coordinate of the sensor S1 from the local coordinate of the sensor S2 while making the position of the sensor S1 the reference.

With reference to FIG. 16, when starting the sensor offset calculation processing, the CPU 56 calculates a rotation offset $^{S1}\theta_{S2}$ as a difference of movement directions $^{S1}\theta_{G1}$ and $^{S1}\theta_{G1}$ about observation $^{S1}G1$ of a certain group that is observed by the range sensor S1 and observation $^{S2}G1$ of the same group that is observed by the sensor S2 (S3202).

Subsequently, the CPU 56 calculates an offset of a translational movement between the two sensors as a difference of center positions ($^{S1}x_{G1}$, $^{S1}y_{G1}$) and ($^{S2}x_{G1}$, $^{S2}y_{G1}$) of the group (S3204).

The CPU 56 outputs calculated transformation matrix $^{S1}_{S2}H_{G1}$ as evaluation of a preliminary relative positional relationship between the sensor S1 and the sensor S2 ("preliminary sensor offset hypothesis").

(Cluster Identification by Hough Transformation Vote Method (S310))

Since the group comparison processing (S300-1) and the sensor offset calculation processing (S300-2) in FIG. 12 are explained, in the following, the "rough relative positional relationship evaluation processing (S310)" that is a next step.

The "rough relative positional relationship evaluation processing (S310)" divides into clusters relative sensor offsets corresponding to matching between the groups of the same sensor pair, and in order to determine a sensor offset with the highest likelihood (a result of "rough relative positional relationship evaluation", that is, the "primary relative positional relationship"), "generalized Hough transformation" as described in the following is utilized.

In order to perform such the processing, a discrete accumulator grid (lattice-shaped divisions for vote processing, and hereinafter, each division called a bin) in an (x, y, θ) space that is the local coordinate of the range sensor S1 is defined while making the range sensor S1 as a reference, and the vote processing to the bin corresponding to evaluation of the preliminary relative positional relationship about each identified social group matching ("preliminary sensor offset hypothesis") is performed.

Figure 17:
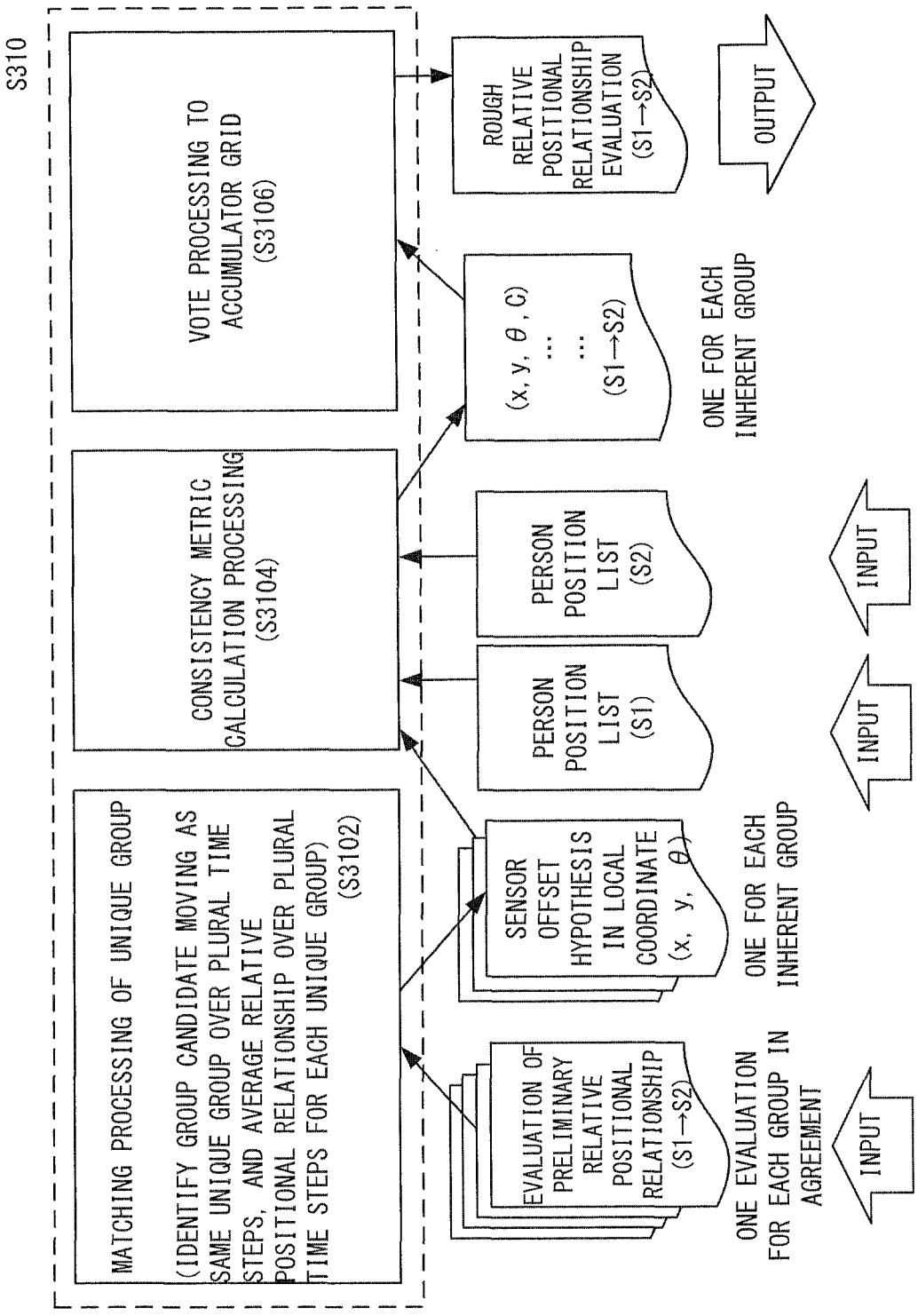
FIG. 17 is a functional block diagram showing a process of "rough relative positional relationship evaluation processing (S310)".

FIG. 17 is a functional block diagram for explaining a process of the "rough relative positional relationship evaluation processing (S310)".

With reference to FIG. 17, first, in the "matching processing (S3102) of unique group", by using evaluation of the preliminary relative positional relationship ("preliminary sensor offset hypothesis") as an input, according to a procedure described later, a group candidate that moves as the same unique group over a plurality of time steps is identified. By averaging the evaluation of the preliminary relative positional relationship in each time step with respect to this unique group over a plurality of time steps, the sensor offset hypothesis in the local coordinate is calculated. That is, the "sensor offset hypothesis in local coordinate" shows the position and the direction of the range sensor S2 averaged with respect to the unique group in the (x, y, θ) space, and expresses a transformation matrix corresponding to this with $^{S1}_{S2}H'_{Gn}$.

Subsequently, the likelihood showing correctness of the sensor offset hypothesis in each local coordinate is calculated as consistency metric C (x, y, θ) in a "consistency metric calculation processing (S3104)".

For evaluation of this likelihood, the consistency metric C (x, y, θ) is calculated based on observation histories of the range sensors S1 and S2 with using the person position list of the two sensors, as described later.

Furthermore, in the "vote processing to accumulator grid (S3106)", as described later, processing to vote to the accumulator grid is performed by adding weight to the number of votes according to the consistency metric C (x, y, θ). By such the weighed vote, a sensitivity to a noise can be decreased (tolerance for a noise can be increased). As a result of the vote, the "sensor offset hypothesis in local coordinate" that has the most number of the votes is output as a result of the "rough relative positional relationship evaluation" ("primary relative positional relationship").

In addition, although the unique group is identified by performing matching between the group candidates of each time step in FIG. 17, the unique group may be identified according to a degree of proximity of moving loci after evaluating a moving locus for each pedestrian by a well-known method, for example.

Figure 18:
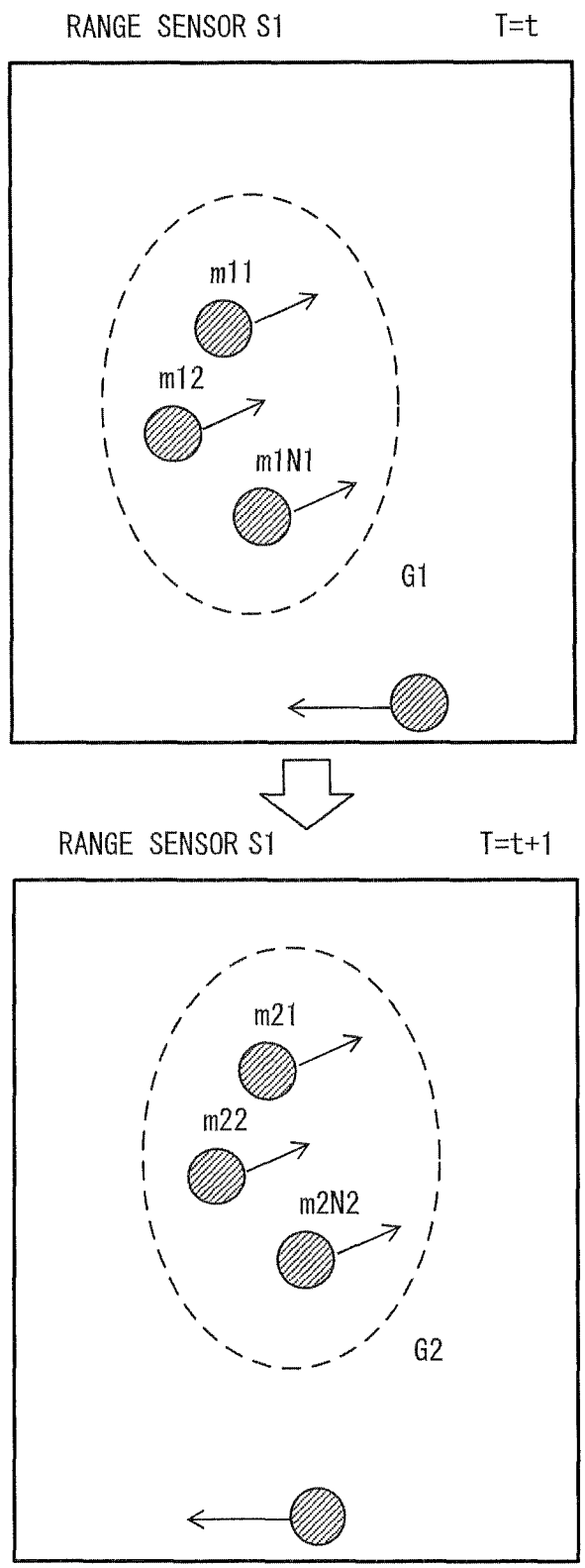
FIG. 18 is a view showing a concept of "matching processing of unique group (S3102)".

FIG. 18 is a view for explaining a concept of "matching processing of unique group (S3102)".

With reference to FIG. 18, the observations about the range sensor S1 in a time step T=t and in a time step T=t+1 are compared by a following procedure.

That is, when the following conditions are satisfied as for the groups (subgroup) G1 and G2, it is determined that these groups are the same unique group.

1) The numbers of the members of the two groups are equal to each other.

2) It is assumed that i-th member $m_i^{G1}$ in the group G1 is in agreement with the corresponding member $m_i^{G2}$ of the group G2 at the time of satisfying following conditions.

2-1) the member $m_i^{G1}$ is the most proximity to the member $m_i^{G2}$ (distance is the shortest).

2-2) the distance between the members $m_i^{G1}$ and $m_i^{G2}$ is equal to or less than the predetermined threshold value.

According to the above-described procedure, the same unique group is extracted, and the "sensor offset hypothesis in local coordinate" is calculated by averaging processing over the moving history of this unique group.

Figure 19:
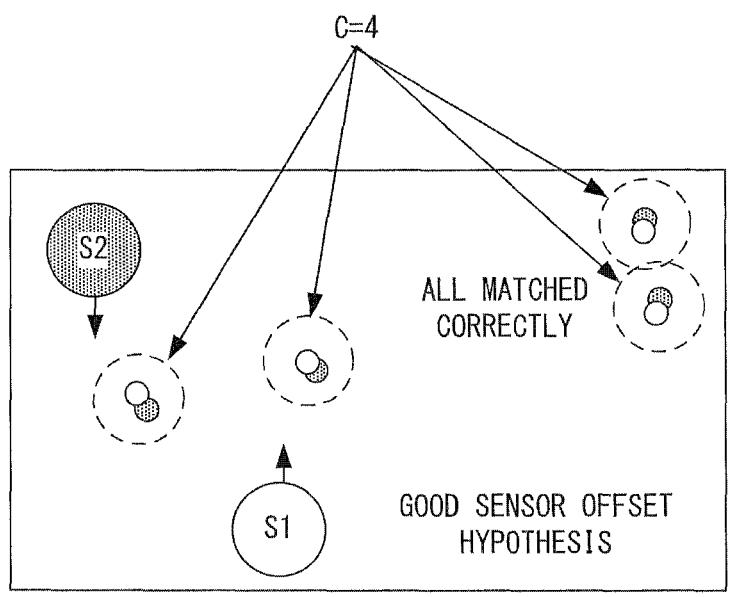
FIG. 19 is a view showing a concept of "consistency metric calculation processing (S3104)".
Figure 19:
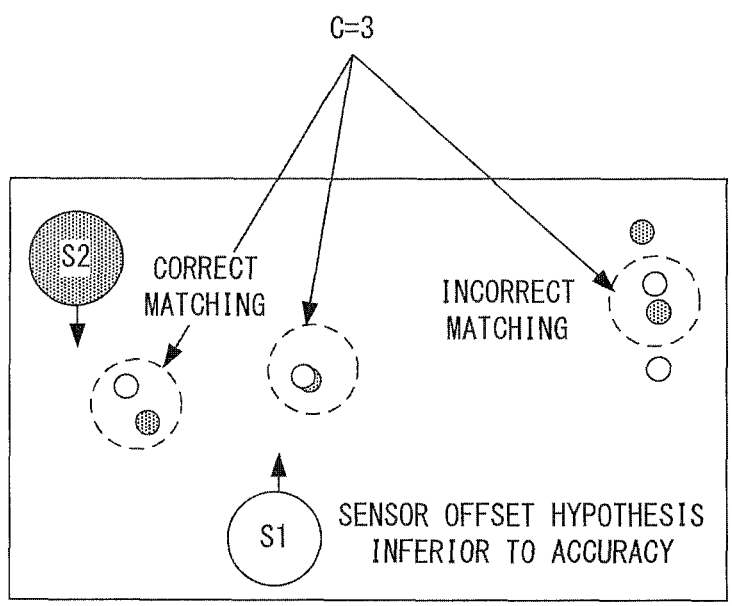

FIG. 19 is a view for explaining a concept of the "consistency metric calculation processing (S3104)".

Here, with respect to each time step in recorded data, a set of two-dimensional positions $^{S1}p_1$ of the objects detected by the range sensor S1, a set of two-dimensional positions $^{S2}p_2$ of the object detected by the range sensor S2, and transformation that is represented by the transformation matrix $^{S1}_{S2}H'_{Gn}$ ("sensor offset hypothesis in local coordinate") based on the observation in common as for the unique group Gn.

The set of positions $^{S1}p_2$ in the coordinate system of the range sensor S1 is obtained by calculating a product called $^{S1}_{S2}H'_{Gn} *^{S2}p_2$. Therefore, the set of positions $^{S1}p_2$ can be directly compared with the position $^{S1}p_1$, and when the sensor offset hypothesis is correct, they become to overlap with each other.

In the "consistency metric calculation processing (S3104)", it is calculated by counting up whether there are how many positions of the object that can be referred to as thus overlapping with each other.

Then, first, in order to find an observation pair used as a target to be determined whether there is such overlapping, filtering is performed by the movement direction of the pedestrian in a manner that only the observation pair that a difference of the movement directions is equal to or less than a threshold angle, that is, having the movement direction of $|^{S1}\theta^{(i)}_{p2} - {}^{S1}\theta_{(j)p1}| < \theta_{match}$ is a candidate of matching.

For each position remains by the above-described filtering in the position $^{S1}p_2$ (that is, each position that is considered by above-described filtering as a candidate for determination), a most proximity search is performed on the position $^{S1}p_1$ about all the points in such the position $^{S1}p_2$.

A k-d tree, for example may be used for this search for calculation efficiency.

The distances from the position $^{S1}p_2^{(i)}$ to a most proximity position $^{S1}p_1^{(j)}$ and a second most proximity position $^{S1}p_1^{(k)}$ are calculated.

Then, it is thought that the most proximity position matches when a ratio of the following Euclid distance is a predetermined value, e.g., equal to or less than 0.8, that is, when the following inequality is satisfied, it is determined that the two positions are overlapped (matched) with each other.

$$\frac{|{}^{S1}p_2^{(i)} - {}^{S1}p_1^{(j)}|}{|{}^{S1}p_2^{(i)} - {}^{S1}p_1^{(k)}|} \le 0.8 \qquad \text{[Formula 1]}$$

On experience, when setting the predetermined value to 0.8, such determination disregards only less than 5% of the inliers whereas removes 90% of the outliers.

Then, the consistency metric C (x, y, θ) can be defined as a total number of the positions that match between the position $^{S1}p_1$ that is observed by the range sensor S1 and the position $^{S1}p_2$ that corresponds to the position that is observed by the range sensor S1 and then converted, except for the observation position included in the group $G_n$ itself that is used for calculating the transformation matrix $^{S1}_{S2}H'_{Gn}$.

When the transformation matrix $^{S1}_{S2}H'_{Gn}$ is far from a true offset between the sensors, the metric C becomes closer to 0 (zero), and the metric C becomes high when it is near the true.

Figure 20:
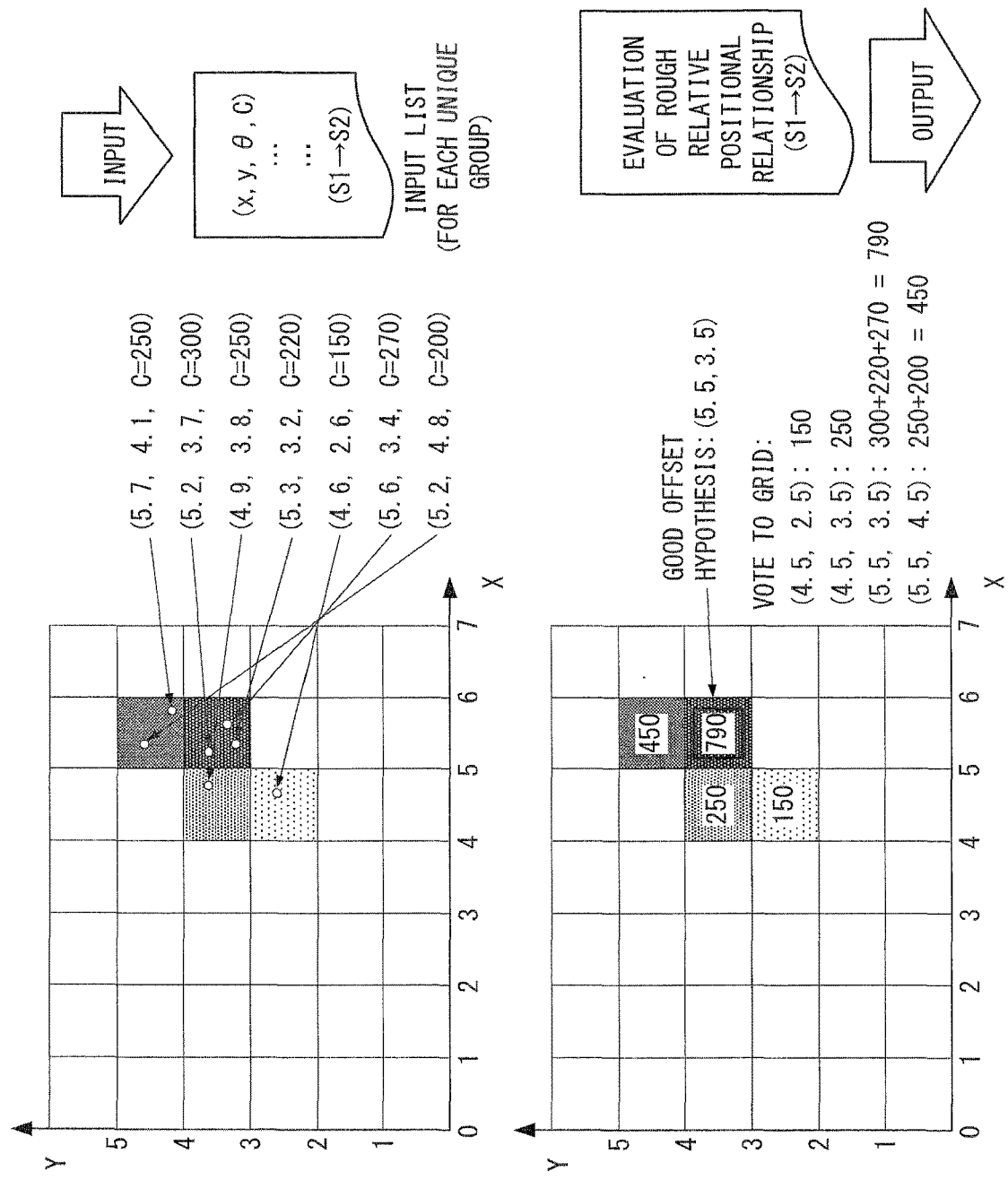
FIG. 20 is a view showing a concept of "vote processing to accumulator grid (S3106)".

FIG. 20 is a view for explaining a concept of the "vote processing (S3106) to accumulator grid".

In FIG. 20, for simplifying, the "sensor offset hypothesis in local coordinate" is expressed only with the (x, y) coordinates out of the (x, y, θ) space.

In the (x, y) space, bins as shown in FIG. 20 are set.

C votes is added to an accumulator bin to each hypothesis with using the consistency metric C (x, y, θ) calculated by the processing of FIG. 19.

Lastly, the hypothesis corresponding to the accumulator bin with the most scores (or when there is no bin of the one most votes, obtained by combining the sets of the pair relevant to all the most vote bins) is output as a result of the "rough relative positional relationship evaluation" ("primary relative positional relationship").

(Removal of Outlier by Robust Estimation)

Figure 21:
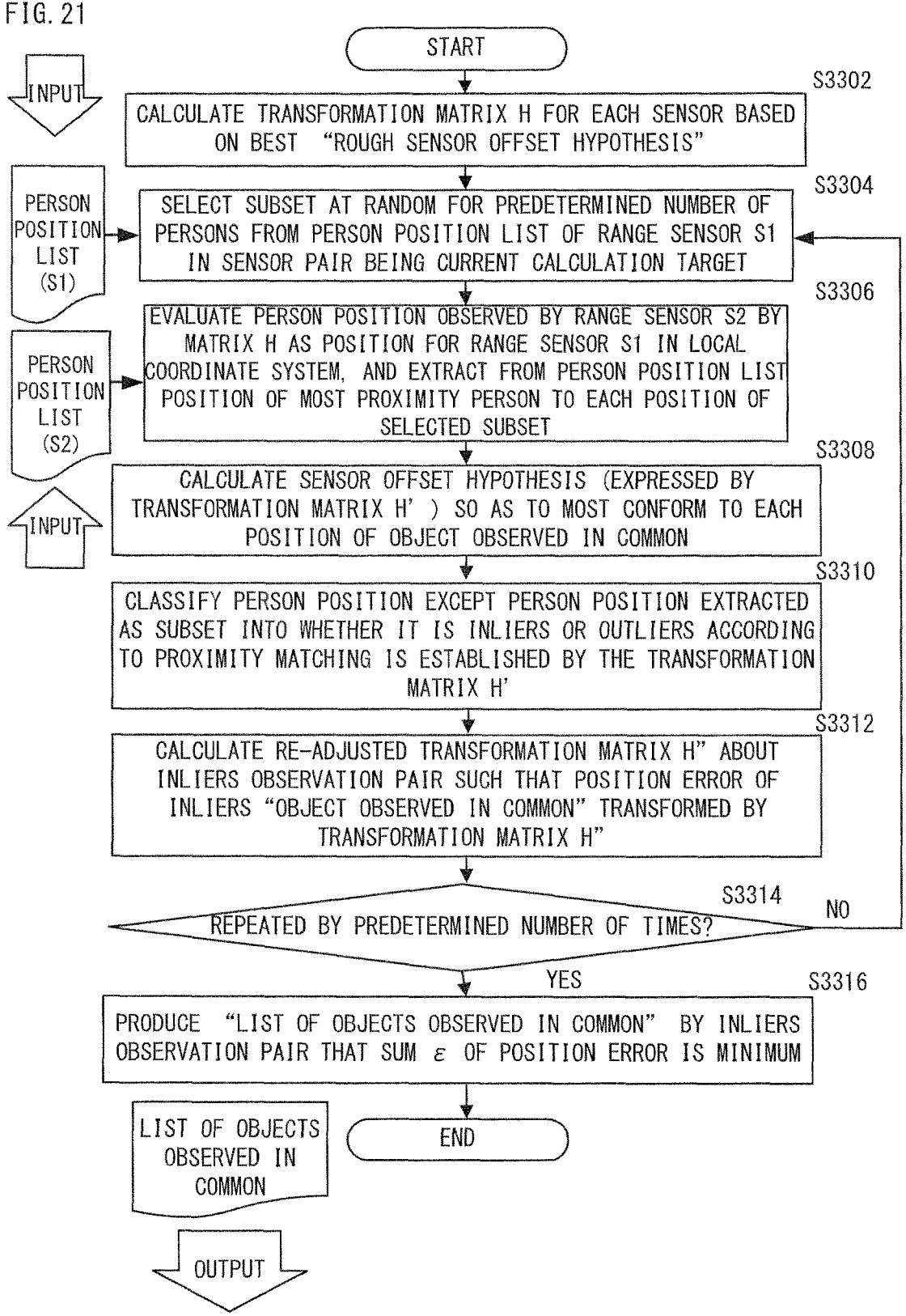
FIG. 21 is a flowchart showing RANSAC processing (S320) shown in FIG. 11.

FIG. 21 is a flowchart for explaining the RANSAC processing (S320) shown in FIG. 11.

If at least one bin can once collect sufficient data that includes the data from groups each having different numbers under the threshold value (for example, it is desirable to consider it as five (5) or more groups), it is thought that the sensor pair has a result of the "rough relative positional relationship evaluation" (rough sensor offset hypothesis) that is reliable at a certain degree.

If each of all the sensors comes to have at least one reliable "rough sensor offset hypothesis" once, the RANSAC (random sample consensus) technology is used in order to readjust each hypothesis by excepting outlier.

As for each sensor pair, following processing is performed with using a set of the best "rough sensor offset hypothesis" obtained by the "rough relative positional relationship evaluation processing (S310)" and corresponding observation pair.

As shown in FIG. 19, since a possibility of incorrectness may slightly exist even after this best "rough sensor offset hypothesis" is obtained, there is a possibility that the group of the observation pair may include outliers (pair of the observation position that does not contribute the consistency metric).

Then, a purpose of the RANSAC processing is to exclude these outliers by further performing readjustment of the sensor offset hypothesis and the corresponding observation pair.

A transformation matrix indicating the best "rough sensor offset hypothesis" is denoted by H. When the transformation matrix H is corresponding to the range sensor pair S1 and S2, the position of the local coordinate of the range sensor S2 is converted into the position of the local coordinate of the range sensor S1 by the transformation matrix H.

With reference to FIG. 21, if the RANSAC processing is started, the CPU 56 calculates the transformation matrix H of each sensor pair based on the best "rough sensor offset hypothesis" (S3302).

Subsequently, the CPU 56 selects subsets at random for the predetermined number of persons from the person position list of the range sensor S1 in the sensor pair that is a current calculation target (S3304).

Furthermore, the CPU 56 evaluates the person position that is observed with the range sensor S2 by the matrix H as a position in the local coordinate system for the range sensor S1, and extracts the position of the most proximity person from the person position list about the range sensor S2 to each position of selected subset in the person position list about the range sensor S1 (S3306). A pair of the person positions thus extracted is called an "object observed in common".

Next, the CPU 56 calculates the sensor offset hypothesis (expressed with a transformation matrix H') so as to most conform to each position of the "object observed in common" (S3308). Using transformation by the transformation matrix H', for example, the transformation matrix H' can be calculated with using a least square method etc. such that an error of the position of the "object observed in common" becomes minimum.

Subsequently, the CPU 56 classifies the person position except the person position having been extracted as a subset into whether it is correct matching (inlier) or incorrect matching (outlier) according to whether the most proximity matching is established by the transformation matrix H' (S3310). Although not limited in particular, it is possible to determine whether it is the most proximity match by a procedure that is similar to that used in calculating the consistency metric. Otherwise, the most proximity matching may be determined by simply determining whether a difference of the distances of the objects is smaller than a predetermined threshold value.

Next, the CPU 56 calculates a transformation matrix H" that is readjusted with using only the observation pair considered as inliers about these inliers observation pair such that an error of the position of the "object observed in common" of the inliers that is converted by the transformation matrix H" is minimized (S3312). Furthermore, a sum s of the error of the position about the observation pair of the inliers is calculated with using the transformation matrix H".

Subsequently, it is determined whether the processing in the steps S3304-S3312 is repeated by the predetermined number of times (S3314), and when not repeated by the predetermined number of times, the process returns to the step S3304.

On the other hand, when repeating by the predetermined number of times, the CPU 56 produces the inliers observation pair that the sum ε of the error of the position is minimum as a "list of objects observed in common" about the target sensor pair.

Here, the sensor offset hypothesis that is denoted by the transformation matrix H" that the sum ε of the error of position becomes minimum is called the "second relative positional relationship".

Such the RANSAC processing is repeated to all the sensor pairs.

(Calculation Procedure Calculating Simultaneous Solution of Network Constraint Condition and Calibration of Sensor Position)

Figure 22:
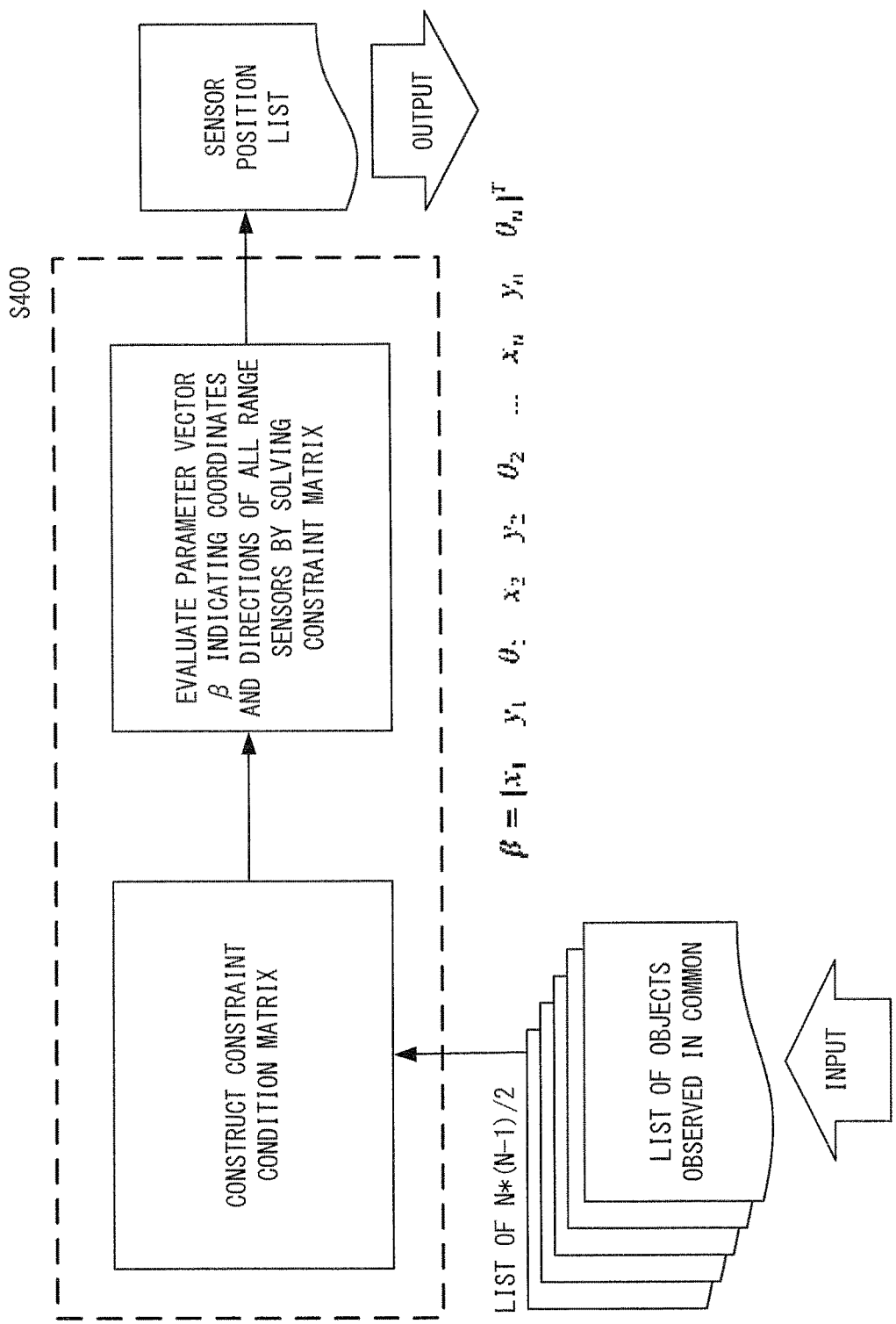
FIG. 22 is a functional block diagram showing "calibration processing of overall network" shown in FIG. 7.

FIG. 22 is a functional block diagram for explaining "calibration processing of overall network" shown in FIG. 7.

The "calibration processing of overall network" combines the position of the "set of inliers observation pair that sums of error of position is minimum" obtained by the RANSAC processing for each sensor pair into a constraint matrix, and solves the matrix to the relative position of all the sensors in the network.

In order to establish the constraint matrix, it is considered that the position in the network coordinate system of n-th range sensor is $(x_n, y_n)$ and the direction is $\theta_n$.

Conversion from the local coordinate system of the range sensor n to the network coordinate system (coordinate system about overall sensor network) requires the rotation of $-\theta n$ and a translational movement of $-x_n$ and $-y_n$ as indicated by the following formula (2).

Here, as an origin of the network coordinate system, the position of the range sensor 1 is adopted, for example.

$$^0T_n = \begin{bmatrix} \cos\theta_n & \sin\theta_n & -x_n \\ -\sin\theta_n & \cos\theta_n & -y_n \\ 0 & 0 & 1 \end{bmatrix}$$ [Formula 2]

The coordinates and the directions of all the range sensors n can be represented as a parameter vector $\beta[x1, y1, \theta1, ---, x_n, y_n, \theta_n]^T$.

The observation np of each person in the local coordinate of the sensor n can be converted into the network coordinate system as follows:

$$^0p = {}^0T_n{}^n p$$ [Formula 3]

Corresponding observation pair $\{^1p, ^2p\}$ shared for each sensor pair is taken into account. This pair expresses the same position in the network coordinate system. Therefore, the error of position in the network coordinate system between the pair should be minimized:

For example, for the range sensor 1 and the range sensor 2, the position of the observation in common given as follows is considered.

$$^1p = \begin{bmatrix} ^1p_x \\ ^1p_y \\ 1 \end{bmatrix}, {}^2p = \begin{bmatrix} ^2p_x \\ ^2p_y \\ 1 \end{bmatrix}$$ [Formula 4]

It is necessary for such common observation to minimize an error function as follows.

$$\varepsilon(\beta) = \|^0T_1{}^1p - {}^0T_2{}^2p\|$$ [Formula 5]

Next, the constraint condition of each of these sensor pairs is combined into a single constraint matrix.

It is considered a single shared observation vector of six (6) rows and one (1) column as follows.

$$p_{1,2}[{}^1p^T {}^2p^T]$$ [Formula 6]

The error of position in the network coordinate system to such an observation vector is represented as in the following formula.

$$[{}^0T_1 - {}^0T_2]p_{1,2} = \begin{bmatrix} {}^0_1p_x - {}^0_2p_x \\ {}^0_1p_y - {}^0_2p_y \\ 0 \end{bmatrix}$$ [Formula 7]

With respect to the pair of the range sensor 1 and the range sensor 2, it is possible to consolidate the error of position to m common observation positions as follows.

$$\left\| \begin{bmatrix} {}^0T_1 - {}^0T_2 & \cdots & 0 \\ \vdots & \ddots & \vdots \\ 0 & \cdots & {}^0T_1 - {}^0T_2 \end{bmatrix} [p_{1,2}^1 \; p_{1,2}^2 \; \cdots \; p_{1,2}^m]^T \right\| = \varepsilon_{1,2}(\beta)$$ [Formula 8]

Elements that appear in this formula are defined as a difference matrix of 3m rows and six (6) columns as follows.

$$D_{1,2} = \begin{bmatrix} {}^0T_1 - {}^0T_2 & \cdots & 0 \\ \vdots & \ddots & \vdots \\ 0 & \cdots & {}^0T_1 - {}^0T_2 \end{bmatrix}$$ [Formula 9]

Furthermore, a shared observation matrix is defined as follows.

$$p_{1,2} = [p_{1,2}{}^1 \; p_{1,2}{}^2 \; \cdots \; p_{1,2}{}^m]^T$$ [Formula 10]

If the observation from other sensor pair is combined, becoming as follows:

[Formula 11]

$$\left\| \begin{bmatrix} D_{1,2} & & & 0 \\ & D_{1,3} & & \\ & & \ddots & \\ 0 & & & D_{n-1,n} \end{bmatrix} \begin{bmatrix} p_{1,2} & & & 0 \\ & p_{1,3} & & \\ & & \ddots & \\ 0 & & & p_{n-1,n} \end{bmatrix} \right\| = \varepsilon(\beta) \quad (2)$$

Then, in the Formula 11, in order to find an optimal value of β that minimizes ε(β) by a lease square method, Levenberg-Marquardt Method is used, for example.

Thus, the information of the position of each range sensor in the network coordinate system can be evaluated.

Furthermore, in actual, the sensor position in the network coordinate system evaluated as described above still has an undefined relationship about the direction and the position with a map of an actual floor. Therefore, after displaying a map of the floor or a photograph from above the floor etc. and the sensor position in the above-described network coordinate system on the display in an overlapped manner, for example, finally by performing the matching manually, it is possible to make the floor map and the position of each range sensor in the network coordinate system consistent with each other.

(Evaluation Experiment)

In order to evaluate performance of an algorithm with comparing with the information on a field work investigation in a contrast environment, calibration accuracy of the sensor position is measured.

Furthermore, tracking precision attained by using the technology of this embodiment is measured in three (3) public places.

Using recorded raw sensor data, both of analyses are conducted off-line.

(Sensor Positioning Accuracy)

Figure 23:
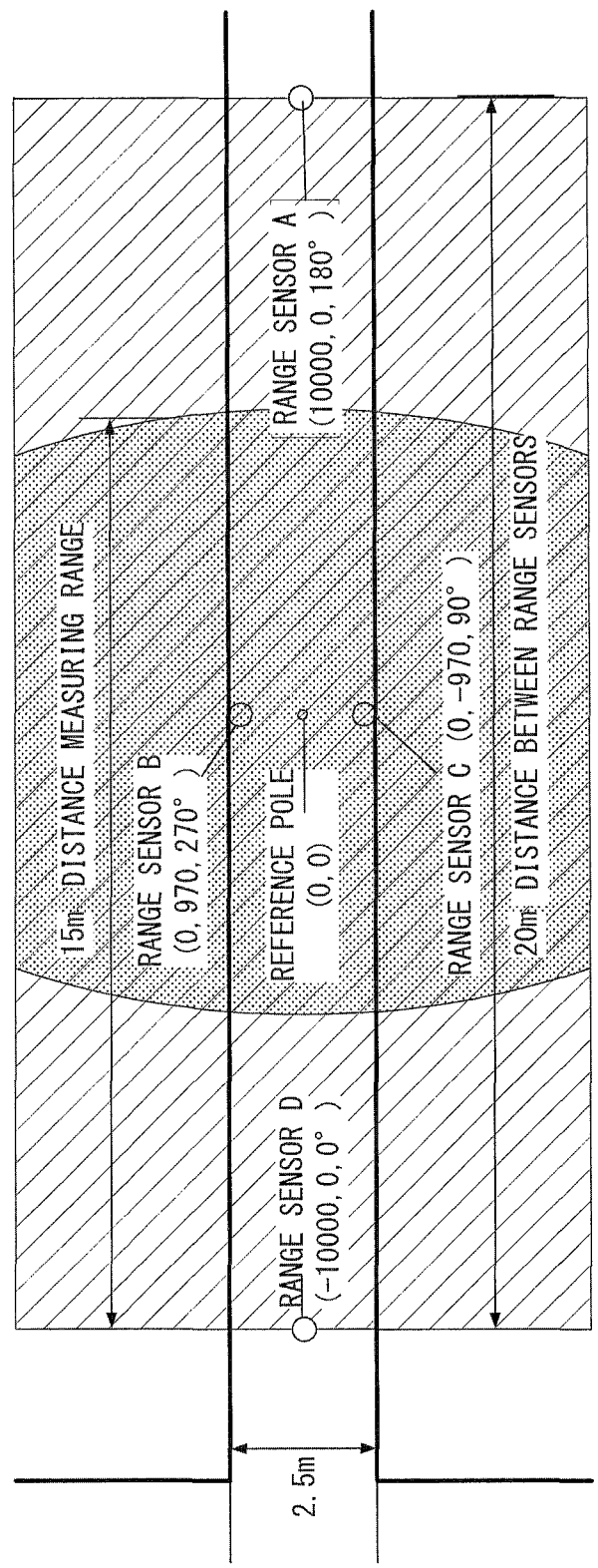
FIG. 23 is a floor map of a place that confirmation of a positioning precision of a sensor position is performed.

FIG. 23 shows the floor map of a place that the positioning accuracy of the sensor position is confirmed.

In order to provide a reference for a field work investigation, as shown in FIG. 23, four (4) sensors are set up in positions measured correctly in a portion of a corridor of a laboratory.

The range sensors are installed in the positions as planned as correctly as possible.

In order to align a sensor angle, a reference pole is placed on the origin, and the sensor is rotated manually until the reference pole becomes to be in agreement with a center scanning point that is detected with the laser range finder.

After that, an exact offset of the sensor is measured with using a high precision laser distance measuring device. Furthermore, in order to align the reference pole and wall detection, the sensor angle is finely tuned by software.

Five (5) trials are performed and five (5) pedestrians walk ten (10) times through the corridor in this trial in a form of groups of two persons or three persons.

After that, the data from each sensor is reproduced off-line and is calibrated with using the system of this embodiment.

FIG. 24 is a view showing a result of such trial.

As shown in FIG. 24, if averaging about four (4) sensors, it is obtained a result that an average translation error is 34 mm and an average angle error is 0.51 degrees.

(Evaluation of Tracking Precision)

Although the precision of the sensor position evaluation is important evaluation of the calibration technology of this embodiment, a final purpose is to enable acquisition of conformal estimate of the pedestrian position from a large number of sensors.

In order to estimate the level of the tracking precision that becomes possible by the technology of this embodiment, three (3) tests of the system in the public space are performed.

About each place, individual data set is used for calibration and evaluation.

However, in evaluation of tracking precision, absolute information of field work investigation of the pedestrian position is not available. Therefore, consistency evaluation is performed based on the center of gravity of the position evaluation from different sensors described below.

The center of gravity position calculated by all the observations from different sensors is denoted with $p^{\wedge(i)}(t)$, and evaluation position of the person (i) at the time (t) that is observed by the sensor s is denoted with $p^{\wedge(i)}_s(t)$.

The number $S^{(i)}(t)$ of the sensors capable of observing the person (i) at a certain position are dependent on the arrangement and occlusion occurs dynamically.

The average error c from the center of gravity is calculated as shown in the following formula 12.

[Formula 12]

$$\varepsilon^{(i)}(t) = \frac{\sum_s \|\hat{p}^{(i)}(t) - p_s^{(i)}(t)\|}{s^{(i)}(t)} \quad (3)$$

The pedestrian who becomes a reference of the set is obtained by identifying corresponding tracks from the different sensors manually. 150 reference pedestrians are identified to each environment.

The $\varepsilon^{(i)}(t)$ is evaluated for each reference pedestrian in each time step that the pedestrian is simultaneously observed by at least two sensors.

In order to visualize a degree of coincidence of tracking as a function of a place of the space, the space is divided into the grids in predetermined resolution.

Each grid is assigned with an average error $\varepsilon^{(i)}(t)$ over all the data positions where the center of gravity exists in the grid, respectively, and a result is shown for each environment in the following.

In comparison, a result of the precision by the manual calibration that did the best effort based on viewing of scan data is included. It is the typical calibration precision that can be utilized before developing this technology.

(Result)

(Straight Line-Like Corridor)

A first environment analyzed is a corridor approximately 50 m in length and 7 m in width of DIAMOR Osaka (registered trademark).

Figure 25:
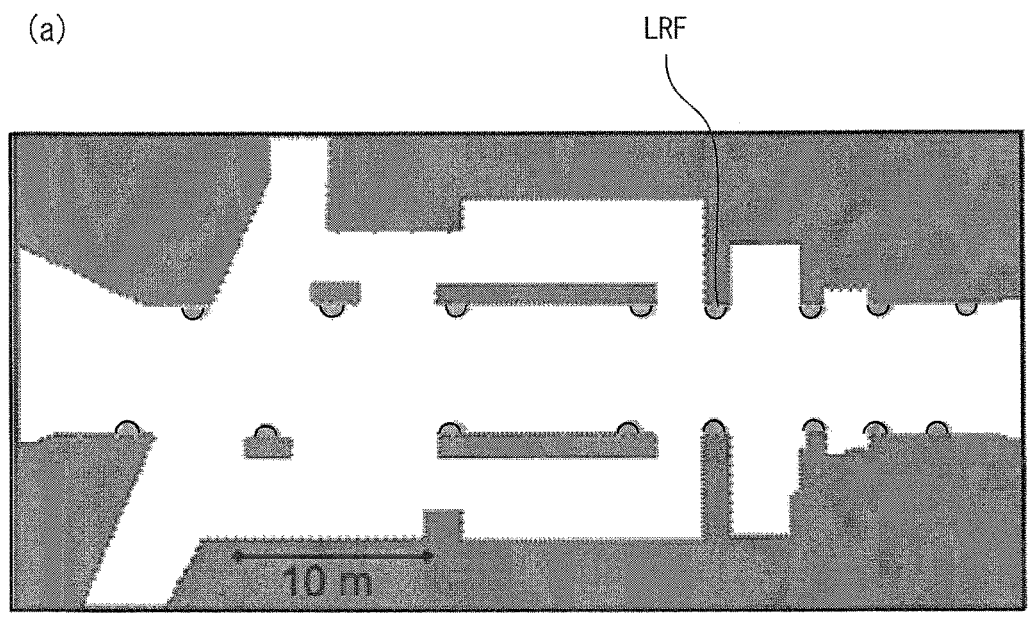
FIG. 25 is a top view of a first environment (FIG. 25($a$)) and its photograph (FIG. 25($b$)).
Figure 25:

FIG. 25 shows a top view (FIG. 25(a)) and photograph (FIG. 25(b)) of such the first environmental.

DIAMOR Osaka is an underground shopping area located between some trains and subway stations in Osaka.

This environment is the geometrically simple area that the areas covered by 16 sensors (shown by a semicircle in FIG. 25(a)) arranged along the straight line corridor overlaps sufficiently.

t is detected that per minute 27.6 pedestrians enter into this environment.

Figure 26:
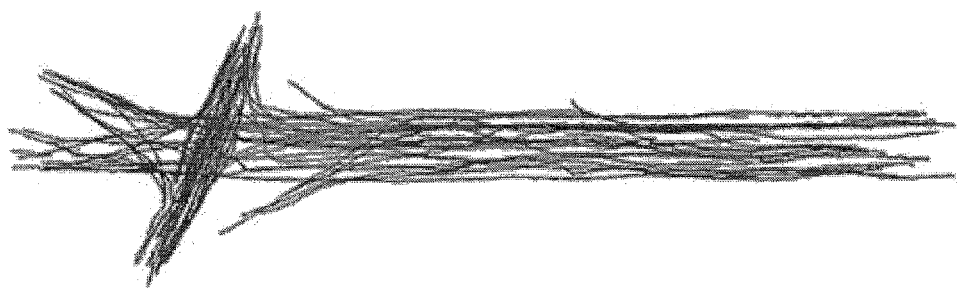
FIG. 26 is a view showing an average error on all the grids and a result of a calibration precision.
Figure 26:
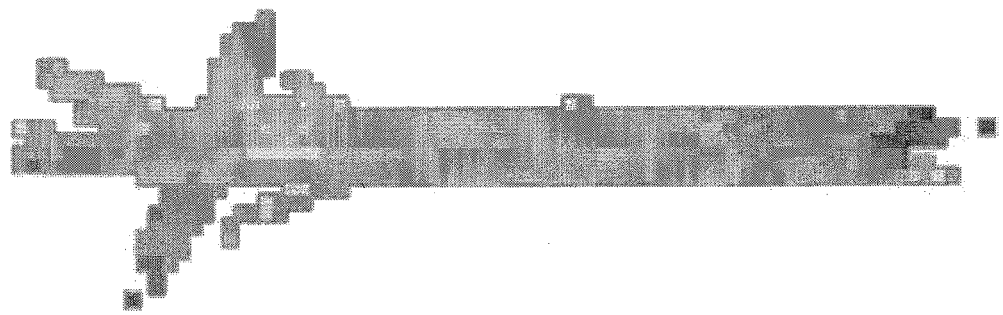
Figure 26:
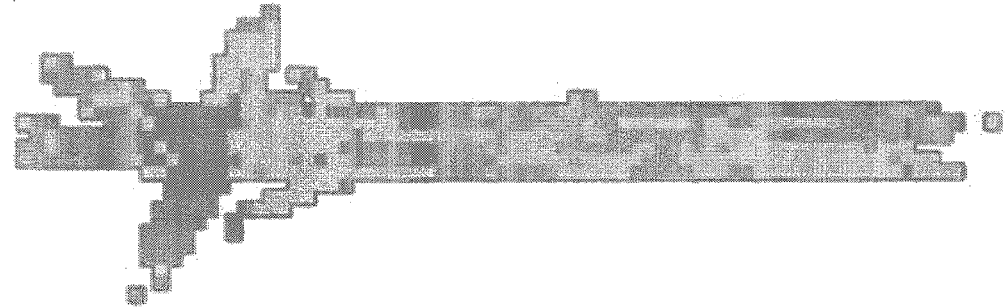
Figure 26:
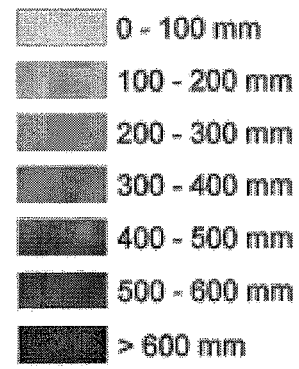

FIG. 26 is a view showing the average error on all the grids and a result of the precision of calibration.

FIG. 26(a) shows pedestrian tracks used in the precision analysis in DIAMOR, FIG. 26(b) shows the error in the space in the manual calibration and FIG. 26(c) shows the error in the space from automatic calibration.

Automatic calibration shows that the error in the space is decreased.

(Large Space with Many Entrances)

Figure 27:
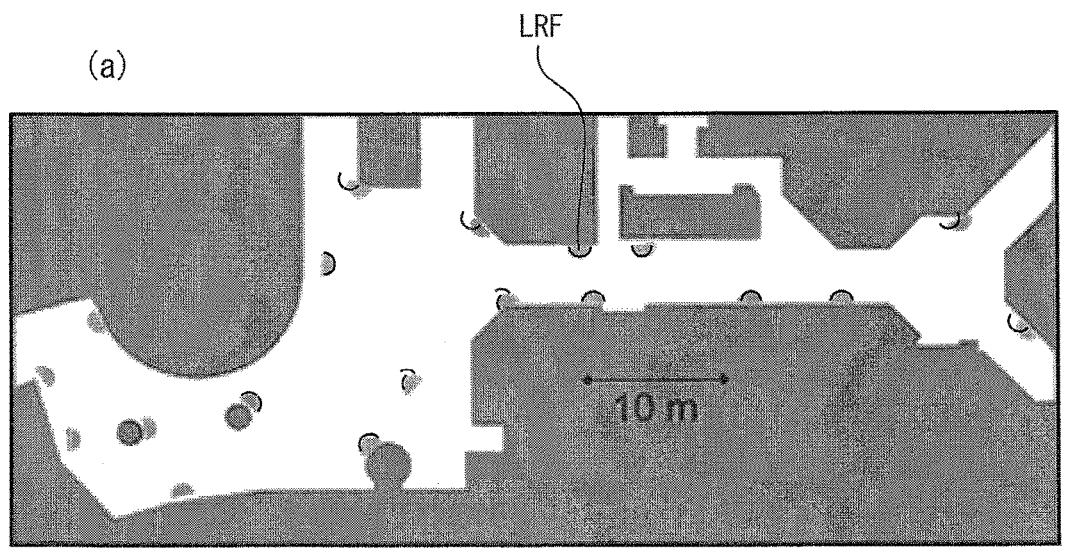
FIG. 27 is a top view (FIG. 27($a$)) and its photograph (FIG. 27($b$)) of a place adopted as a second environment.
Figure 27:
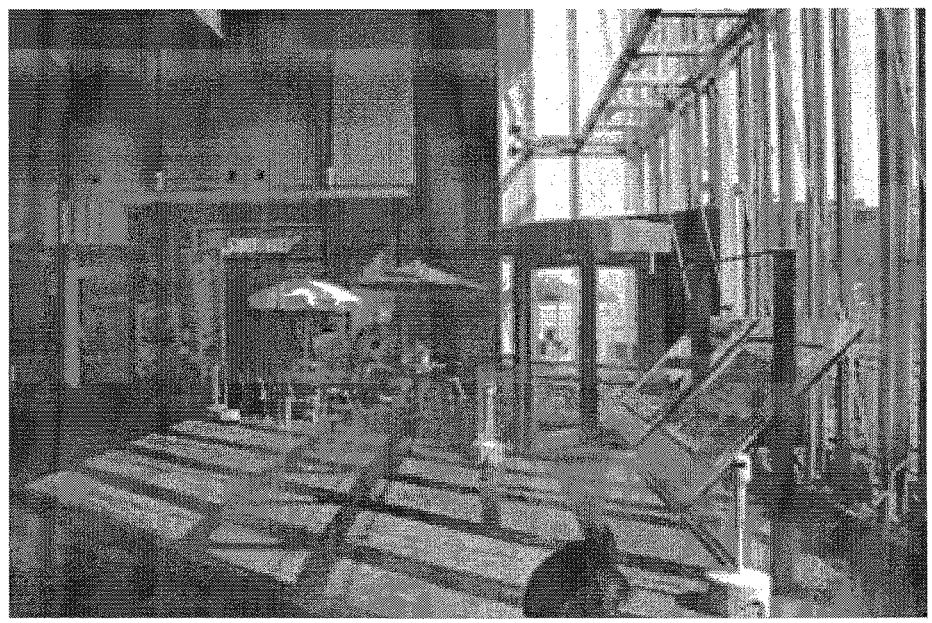

FIG. 27 shows a top view (FIG. 27(a)) and photograph (FIG. 27(b)) of a place adopted as a second environment.

As shown in FIG. 27, the second environment is Asia & Pacific Trade Center (ATC) that is a complex of retail and wholesale sales trade at Osaka waterfront. This environment consists of a corridor connected between large open-ceiling spaces, and is a space of 60 m in length and 25 m or more in width at the largest point.

Per minute an average of 31.8 pedestrians enter into this environment.

The sensor network consists of 19 sensors.

Figure 28:
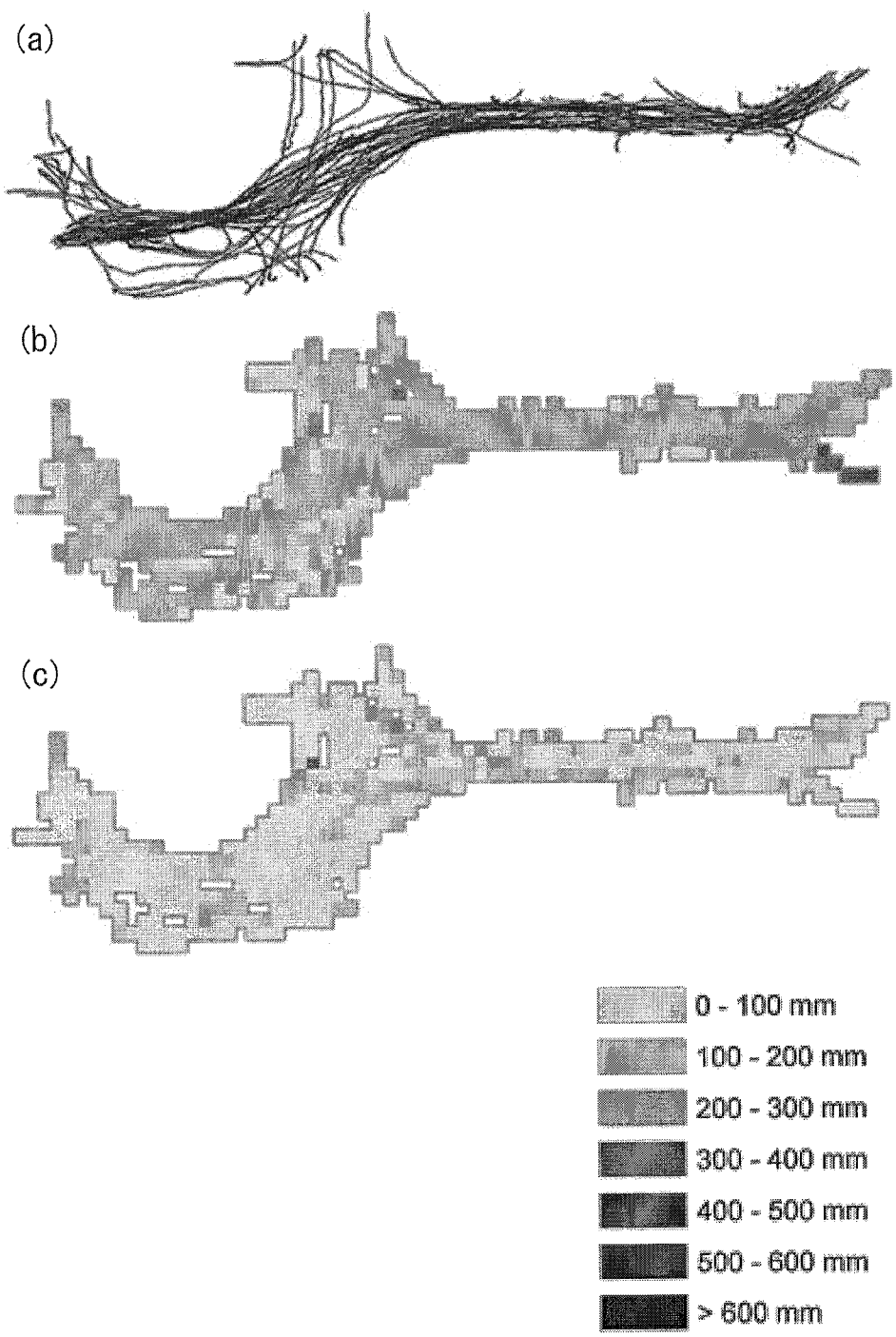
FIG. 28 is a view showing an average error on all the grids and a result of a calibration precision.

FIG. 28 is a view showing a result of calibration precision together with an average error on all the grids.

FIG. 28(a) shows pedestrian tracks used in the precision analysis in ATC, FIG. 28(b) shows the error in the space in the manual calibration and FIG. 28(c) shows the error in the space from automatic calibration.

Here, automatic calibration also shows that the error in the space is decreased.

Furthermore, similar experiment is conducted on a floor in a supermarket as a third environment, and the same or similar result as the first and second environment is obtained.

(Analysis of Steps of Algorithm)

Figure 29:
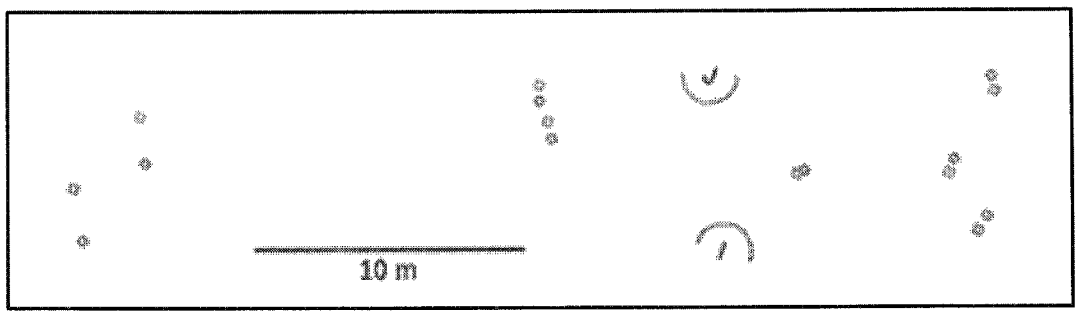
FIG. 29 is a view showing relative effectiveness of each step of an algorithm.
Figure 29:
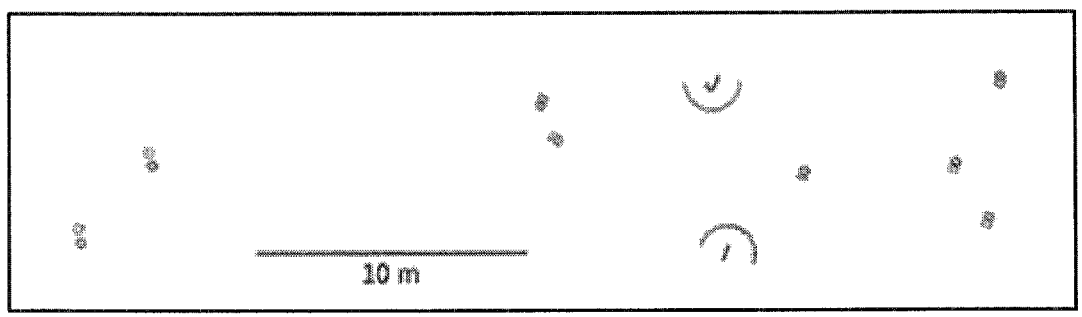
Figure 29:
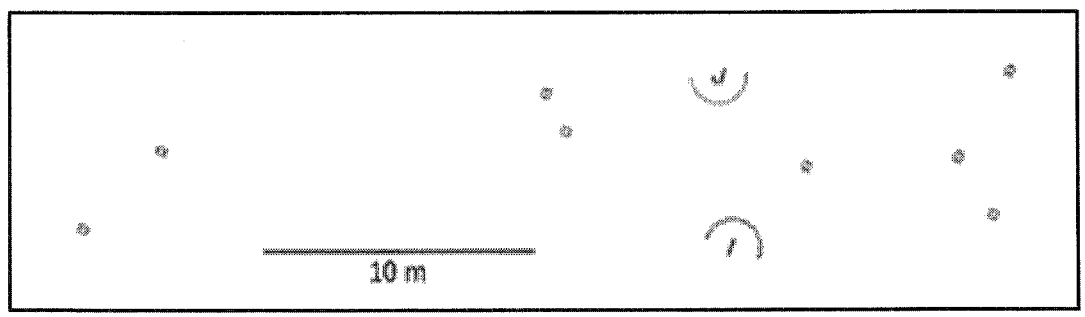

FIG. 29 is a view showing relative effectiveness of each step of an algorithm.

In order to show such relative effectiveness, FIG. 29(a), FIG. 29(b) and FIG. 29(c) respectively show alignment of person position detected by two sensors in a single time frame based on corresponding sensor offset hypothesis, FIG. 29(a) is of after Hough transformation processing, FIG. 29(b) is of after RANSAC processing and FIG. 29(c) is of after final calibration.

It is realized that after the final calibration, the observation positions by the two sensors are almost overlapped.

With the algorithm of the calibration of this embodiment, in order to produce one set of matching during observation of the human by means of the sensor pair, each sensor offset hypothesis is used, and eventually one set of human observation is used in order to produce a restraint condition matrix.

The precision of the final calibration is strongly dependent on whether outliers in this restraint condition matrix can be excluded.

Then, in order to show how each step of the algorithm decreases outliers, a confusion matrix that indicates a rate of exact human observation matching produced at each step is calculated to three (3) stages of the calibration process.

Based on another set of tracks in the field work investigation of the reference pedestrian taken from the data set used for performing the calibration, such a confusion matrix is calculated about group matching, generalized Hough transformation and RANSAC.

FIG. 30 is a view showing the confusion matrix that is evaluated in the first to third environment, respectively.

It is realized that even after the generalized Hough transformation, matching of the person position at a rate of 90% or more is obtained, and after RANSAC processing, matching of the person position at a rate of 99% or more is obtained in any environment.

As shown by such a result, it is realized that each processing step contributes to the precision of the final calibration, respectively, and essentially reduces the number of erroneous detection.

According to the calibration apparatus, the calibration method and the calibration program of this embodiment, when a plurality of range sensors are installed in a certain area, it is possible to reduce a workload for calibrating a position and a direction of each range sensor in a manner that a physical object is put in the environment so as to align the range sensor to the object manually, for example.

Furthermore, according to the calibration apparatus, the calibration method and the calibration program of this embodiment, when a plurality of range sensors are installed in a certain area, it is possible to calibrate a position and a direction of the range sensor without affecting the human activity in the area targeted for the measurement.

Furthermore, according to the calibration apparatus, the calibration method and the calibration program of this embodiment, it is possible to calibrate a position and a direction of the range sensor even if it is environment that forms of movement loci of people resembled closely and a plurality of persons are walking simultaneously.

The embodiment indicated by this application at this time is exemplification of the structure for embodying the present invention concretely, and does not restrict the technical scope of the present invention. The technical scope of the present invention is shown by the claims, not description of the embodiment, and it is intended to include modification within the literally scope of the claims and the scope of equivalents meaning of the claims.

REFERENCE SIGNS LIST 10.1-10.$n$ laser range finder, 52 drive device, 54 nonvolatile storage, 56 CPU, 58 ROM, 60 RAM, 64 external record medium, 66 bus, 100 measurement arithmetic unit, 5602 data capture processing portion, 5604 capture data recording processing portion, 5608 person position extraction portion, 5610 social group identification portion, 5612 group comparison portion, 5614 generalized Hough transformation processing portion, 5616 RANSAC processing portion and 5620 network position specific portion.

What is claimed is:

1. A calibration apparatus for performing calibration of positions and directions of a plurality of range sensors installed in an area, each range sensor of the plurality of range sensors measuring a distance between two points in a noncontact manner, comprising:
  an interface device configured to receive measurement data from each range sensor of said plurality of range sensors;
  a storage device configured to store said measurement data from each range sensor of said plurality of range sensors in a time series; and
  an arithmetic processing unit configured to perform said calibration based on said measurement data,
  wherein said arithmetic processing unit is configured to
  a) detect positions of moving objects in said area for each range sensor of said plurality of range sensors;
  b) identify a set of group candidates and pose invariant features of said set of group candidates, each group candidate of said set of group candidates being identified as a group among said moving objects that are detected for each range sensor of said plurality of range sensors;
  c) i) calculate a relative positional relationship between each pair of said plurality of range sensors by identifying a set of moving objects observed in common for each pair of said plurality of range sensors based on said set of group candidates and said pose invariant features of said set of group candidates, and ii) adjust said relative positional relationship so as to minimize positional errors of the moving objects observed in common for each pair of said plurality of range sensors; and
  d) perform calibration of the positions and directions of said plurality of range sensors in a network of said plurality of range sensors based on the adjusted relative positional relationship to minimize positional errors of the moving objects observed in common for each pair of said plurality of range sensors.

2. The calibration apparatus according to claim 1, wherein in order to perform processing for adjusting said relative positional relationship, said arithmetic processing unit comprises:
a group matching portion configured to perform matching, wherein the matching portion matches a first group candidate and a second group candidate for each pair out of said plurality of range sensors based on said pose invariant features, said first group candidate and said second group candidate being respectively measured by said pair of said plurality of range sensors;
a pair position hypothesis calculation portion configured to calculate a primary relative positional relationship between each pair of said range sensors based on the positions and the directions of the candidates of the moving objects detected by each of the sensors, the detected candidates of the moving objects being identified as moving in a unique group among said matched first group candidate and second group candidate; and
a robust estimation portion configured to robustly estimate a secondary relative positional relationship between said pair of range sensors by adjusting said primary relative positional relationship with rejecting outliers through matching said moving objects detected by each range sensor of the plurality of range sensors for each pair of said plurality of range sensors, and calculate the positions of said moving objects observed in common with said minimized errors.

3. The calibration apparatus according to claim 1, wherein said pose invariant features of said set of group candidates includes the number of the moving objects included in said set of group candidates, a moving direction of said set of group candidates and a position of each moving object with respect to a geometrical center position of said set of group candidates.

4. The calibration apparatus according to claim 2, wherein in order to perform processing that identifies said pose invariant features of said first group candidate and said second group candidate, said arithmetic processing unit comprises:
an enumeration portion configured to enumerate a plurality of subgroups each subgroup of the plurality of subgroups having at least two objects included in the candidate group of the objects detected as a group; and
an identifying portion configured to identify said pose invariant features for each said subgroup, wherein
said group matching portion performs matching for each said subgroup.

5. The calibration apparatus according to claim 2, wherein said pair position hypothesis calculation portion includes
a calculation portion configured to calculate the primary relative positional relationship between said pair of the sensors in a local coordinate of each said pair of range sensors based on said matched first group candidate and second group candidate, and
a vote portion configured to perform vote processing to bins each representing said primary relative positional relationship of said pair of sensors with respect to all the matched group candidates so as to identify the primary relative positional relationship with the most votes as said primary relative positional relationship, said bins being discretely defined in said local coordinate.

6. The calibration apparatus according to claim 5, wherein said vote portion is configured to perform the vote weighted by consistency metric, wherein the consistency metric is defined as a total number of the objects having positions that are determined to be matched after transformation by said primary relative positional relationship, and the number of the objects in said matched first group candidate and second group candidate are excluded from said total number of the objects.

7. The calibration apparatus according to claim 2, wherein said robust estimation portion is configured to perform estimation of said secondary relative positional relationship by RANSAC (random sample consensus).

8. The calibration apparatus according to claim 2, wherein in order to perform calibration of the positions and the directions of said plurality of range sensors, said arithmetic processing unit comprises a portion configured to i) combine into a constraint matrix the positions of the inliers of said moving objects observed in common corresponding to said secondary relative positional relationship for each pair of said plurality of range sensors, and ii) perform the calibration of the positions and the directions of each of said plurality of range sensors by solving said constraint matrix for the relative positions of all said plurality of range sensors under calibration.

9. The calibration apparatus according to claim 1, wherein each of said plurality of range sensors is a two-dimensional laser range finder that detects distances from a sensor position to the object for each predetermined angle step.

10. A calibration method for performing calibration of positions and directions of a plurality of range sensors installed in an area, each range sensor of the plurality of range sensors measuring a distance between two points in a noncontact manner, comprising steps of:
detecting positions of moving objects in said area for each range sensor of said plurality of range sensors;
identifying a set of group candidates and pose invariant features of said set of group candidates, each group candidate of said set of group candidates being identified as a group among said moving objects detected for each range sensor of said plurality of range sensors;
calculating a relative positional relationship between each pair of said plurality of range sensors by identifying a set of moving objects observed in common for each pair of said plurality of range sensors based on the set of group candidates and the pose invariant features of said set of group candidates;
adjusting said relative positional relationship so as to minimize positional errors of the moving objects observed in common for each pair of said plurality of range sensors; and
performing calibration of the positions and directions of said plurality of range sensors in a network of said plurality of range sensors based on the adjusted relative positional relationship to minimize positional errors of the moving objects observed in common for each pair of said plurality of range sensors positions.

11. A non-transitory computer-readable storage medium storing a calibration program for making a computer perform calibration of positions and directions of a plurality of range sensors installed in an area, each range sensor of the plurality of range sensors measuring a distance between two points in a noncontact manner, said calibration program causing said computer to perform steps of:
detecting positions of moving objects in said area for each range sensor of said plurality of range sensors;

identifying a set of group candidates and pose invariant features of said set of group candidates, each group candidate of said set of group candidates being identified as a group among said moving objects detected for each range sensor of said plurality of range sensors;

calculating a relative positional relationship between each pair of said plurality of range sensors by identifying a set of moving objects observed in common for each pair of said plurality of range sensors based on the set of group candidates and the pose invariant features of said set of group candidates;

adjusting said relative positional relationship so as to minimize positional errors of the moving objects observed in common for each pair of said plurality of range sensors; and performing calibration of the positions and directions of said plurality of range sensors in a network of said plurality of range sensors based on the adjusted relative positional relationship to minimize positional errors of the moving objects observed in common for each pair of said plurality of range sensors.

\* \* \* \* \*